United States Patent
Anderson et al.

(10) Patent No.: US 10,960,719 B2
(45) Date of Patent: Mar. 30, 2021

(54) APPARATUS AND METHOD FOR MEASURING FORCE ON WEIGHT DISTRIBUTION HITCHES

(71) Applicant: Progress Mfg. Inc., Provo, UT (US)

(72) Inventors: Jed K. Anderson, Lindon, UT (US); Jason R. Harper, Spanish Fork, UT (US); Matthew D. Barnes, Lehi, UT (US); David F. Lundgreen, Spanish Fork, UT (US)

(73) Assignee: PROGRESS MFG. INC., Provo, UT (US)

( * ) Notice: Subject to any disclaimer, the term of this patent is extended or adjusted under 35 U.S.C. 154(b) by 88 days.

(21) Appl. No.: 15/883,001

(22) Filed: Jan. 29, 2018

(65) Prior Publication Data
US 2019/0232740 A1    Aug. 1, 2019

(51) Int. Cl.
*B60D 1/24* (2006.01)
*B60D 1/167* (2006.01)
*G01L 5/00* (2006.01)

(52) U.S. Cl.
CPC ............. *B60D 1/248* (2013.01); *B60D 1/167* (2013.01); *G01L 5/0033* (2013.01)

(58) Field of Classification Search
CPC ........ B60D 1/247; B60D 1/248; B60D 1/167; B60D 1/62; G01L 5/0033
USPC ....................................................... 280/504
See application file for complete search history.

(56) References Cited

U.S. PATENT DOCUMENTS

| | | | |
|---|---|---|---|
| 2,876,922 A * | 3/1959 | Holiday | B60P 3/1033 414/476 |
| 3,751,069 A * | 8/1973 | Suckow | B60D 1/345 280/406.2 |
| 3,785,680 A * | 1/1974 | Good | B60D 1/32 280/455.1 |
| 4,319,766 A | 3/1982 | Corteg et al. | |
| 4,722,542 A * | 2/1988 | Hensley | B60D 1/173 280/447 |

(Continued)

FOREIGN PATENT DOCUMENTS

| EP | 0686839 | 12/1995 |
|---|---|---|
| EP | 2280263 | 2/2011 |

(Continued)

OTHER PUBLICATIONS

Weigh Safe Photo—Photograph taken Dec. 27, 2017, at publicly assessable product exhibit in South Jordan, Utah, of a third party product.

(Continued)

*Primary Examiner* — Ruth Ilan
*Assistant Examiner* — Felicia L. Brittman
(74) *Attorney, Agent, or Firm* — Morriss O'Bryant Compagni Cannon, PLLC

(57) ABSTRACT

A trailer force measurement system includes a tow hitch, a hitch mount connected to the tow hitch and a spring bar connected to the hitch mount. The trailer force measurement system also includes a trailer having a frame, where the spring bar is connected to the trailer frame via a bracket. A hitch coupler is then connected to the trailer frame and configured to releasably couple the trailer frame to the hitch mount. A force measurement device is then disposed on the bracket and configured to measure force exerted on the bracket by the spring bar.

29 Claims, 27 Drawing Sheets

(56) References Cited

U.S. PATENT DOCUMENTS

| | | | |
|---|---|---|---|
| 5,060,965 A | 10/1991 | Haefner et al. | |
| 5,149,121 A | 9/1992 | Hafner | |
| 5,441,293 A | 8/1995 | Sturgess | |
| 5,868,414 A * | 2/1999 | McCoy | B60D 1/143 |
| | | | 280/406.2 |
| 6,053,521 A | 4/2000 | Schertler | |
| 6,253,626 B1 | 7/2001 | Shoberg et al. | |
| 6,585,079 B1 * | 7/2003 | Weyer | B66F 9/0655 |
| | | | 182/18 |
| 6,722,684 B1 | 4/2004 | McAllister | |
| 8,380,390 B2 | 2/2013 | Sy et al. | |
| 9,004,523 B2 | 4/2015 | Scharf | |
| 9,056,535 B2 | 6/2015 | Materna et al. | |
| 9,738,125 B1 * | 8/2017 | Brickley | B60D 1/26 |
| 2006/0290102 A1 | 12/2006 | VanBuskirk, Jr. | |
| 2008/0177435 A1 | 7/2008 | Caporali et al. | |
| 2011/0036646 A1 | 2/2011 | Dack | |
| 2011/0042154 A1 | 2/2011 | Bartel | |
| 2012/0024081 A1 | 2/2012 | Baker | |
| 2013/0038436 A1 | 2/2013 | Brey et al. | |
| 2013/0253814 A1 * | 9/2013 | Wirthlin | G01G 19/02 |
| | | | 701/124 |
| 2014/0195124 A1 | 7/2014 | Wellhoefer et al. | |
| 2015/0105975 A1 | 4/2015 | Dunn | |
| 2015/0204741 A1 | 7/2015 | Hagan | |
| 2016/0231165 A1 | 8/2016 | Fredrickson | |
| 2017/0015163 A1 | 1/2017 | Sielhorst | |
| 2017/0305215 A1 | 10/2017 | Scheips et al. | |

FOREIGN PATENT DOCUMENTS

| | | |
|---|---|---|
| EP | 2905155 | 8/2015 |
| GB | 2221047 | 1/1990 |
| GB | 2275117 | 8/1994 |
| WO | WO2015073960 | 5/2015 |
| WO | WO2016141384 | 9/2016 |
| WO | WO2017144084 | 8/2017 |

OTHER PUBLICATIONS

Print from web site showing Weigh Safe Trailer Drop Hitch, from third party web site on Apr. 23, 2018 (https://www.weigh-safe.com/product/weigh-safe-drop-hitch/).

* cited by examiner

APPARATUS AND METHOD FOR MEASURING FORCE ON WEIGHT DISTRIBUTION HITCHES

CROSS-REFERENCE TO RELATED APPLICATIONS

Not applicable.

STATEMENT REGARDING FEDERALLY SPONSORED RESEARCH OR DEVELOPMENT

Not Applicable.

BACKGROUND

1. The Field of the Present Disclosure

The present disclosure relates generally to trailer weight distribution hitch systems, and more particularly, but not necessarily entirely, to trailer hitch systems for measuring the weight and resulting forces exerted by a trailer.

2. Description of Related Art

Trailer hitches are utilized to couple tow vehicles and trailers. In a standard configuration, a trailer hitch may comprise a receiver permanently mounted to the undercarriage of the tow vehicle. A ball mount may include a shank portion configured and adapted to be installed in the receiver. Conventional hitches may include a drop bar or weight distribution hitch having a plurality discrete mounting locations for a ball support member. The ball support member may be selectively secured to any one of the plurality of discrete mounting locations using a manual or integrated pin.

It will also be appreciated that the correct balance of a trailer load is necessary for safe towing. Despite the advantages of the known trailer hitches, improvements are still being sought. The prior art is characterized by several disadvantages that may be addressed by the present disclosure. The present disclosure minimizes, and in some aspects eliminates, the failures of the prior art, by utilizing the system and components described herein.

The features and advantages of the present disclosure will be set forth in the description which follows, and in part will be apparent from the description, or may be learned by the practice of the present disclosure without undue experimentation. The features and advantages of the present disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
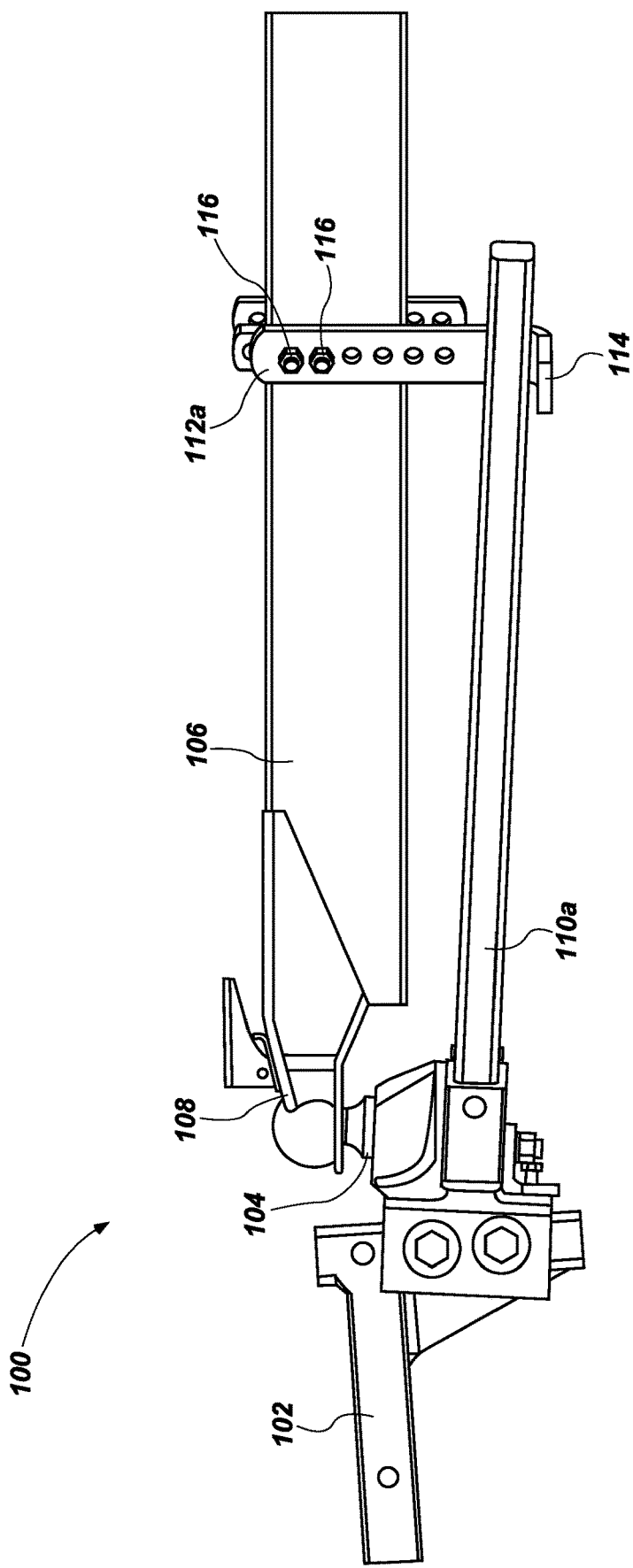
FIG. 1 is a perspective side view of an embodiment of an embodiment of a trailer force measurement system according to the present disclosure.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

In describing and claiming the present disclosure, the following terminology will be used in accordance with the definitions set out below. As used in this specification and the appended claims, the singular forms "a," "an," and "the" include plural referents unless the context clearly dictates otherwise. As used herein, the terms "comprising," "including," "having," "containing," "characterized by," and grammatical equivalents thereof are inclusive or open-ended terms that do not exclude additional, unrecited elements or method steps.

Applicant has discovered an improved trailer weight distribution system that can measure the load of a trailer by the forces exerted on spring bars or other trailer connection mechanisms.

The generally accepted safe and proper tongue weight is roughly 10 to 15 percent of the total loaded trailer weight. The load of a trailer should also be properly balanced to achieve a tongue weight within the safe and proper range. Applicant has discovered that providing a simple mechanism configured to measure the load weight of the trailer, integrated with a trailer weight distribution system, can greatly reduce unsafe towing by providing users an effective mechanism configured to measure tongue weight distribution and properly transferring the load of the trailer across the tow vehicle and trailer axles.

Figure 2:
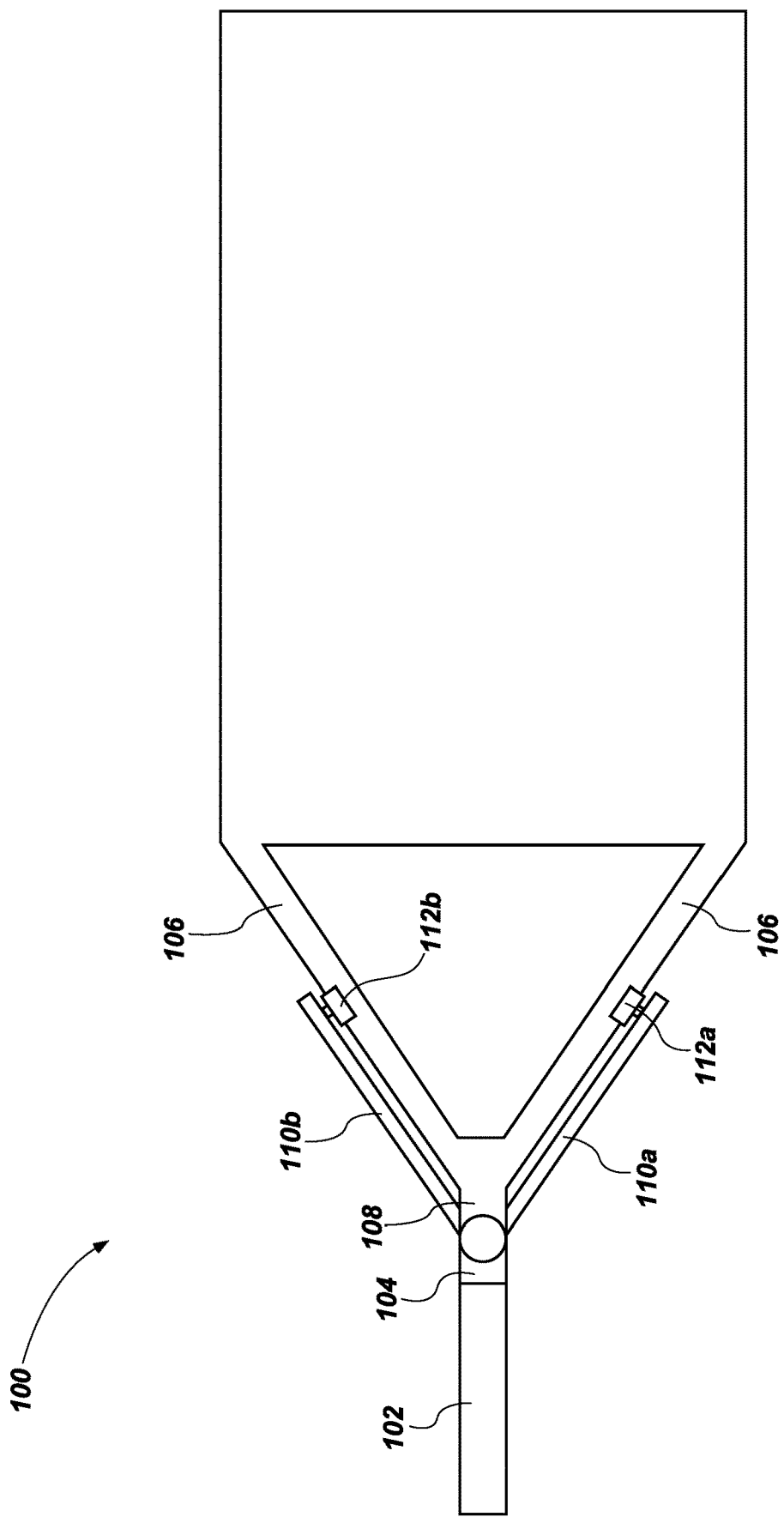
FIG. 2 is a schematic top view of the embodiment of FIG. 1.

As shown in FIGS. 1 and 2, a force measurement system 100 for a weight distribution hitch, includes a weight distribution hitch 102, which may also be referred to as a hitch mount, connected to a tow hitch such as a hitch ball 104 or other suitable tow hitch (a partially spherical portion of the hitch ball 104 is not shown, because it is contained within a partially spherical concave portion of a hitch coupler 108, as shown). The hitch ball 104 can be removably coupled to the weight distribution hitch 102, or hitch mount, and can be positioned at different desired heights, relative to the weight distribution hitch 102.

In use, the weight distribution hitch 102 is mounted, disposed, fixed or attached to a tow vehicle (not shown) having a plurality of axles. A trailer frame 106, of a trailer having at least one axle (not shown) is connected to the hitch coupler 108 and the hitch coupler 108 is coupled and secured to the hitch ball 104. The hitch coupler 108 may be integral with the trailer frame 106 or removably coupled thereto. The hitch coupler 108 can include a cavity portion configured to receive a ball, or post, portion of the hitch ball 104, and a coupler latch which is configured to lock the hitch ball 104 within the cavity portion of the hitch coupler 108.

A hitch coupler may be any device or mechanism configured to secure or join the hitch ball 104 to the trailer frame 106. For example, a hitch coupler may include, but is not limited to, the hitch coupler 108 as shown in FIG. 1, including a cavity portion configured to receive a ball, or post, portion of the hitch ball 104, and a coupler latch which is configured to lock the hitch ball 104 within the cavity portion of the hitch coupler 108.

A pair of spring bars 110a and 110b are secured to an underside of the hitch ball 104 on one end of the spring bars 110a and 110b and secured to a corresponding bracket 112a and 112b on the opposing end of the spring bars 110a and 110b. It is to be understood in the disclosure of additional embodiments herein that there are two spring bars (even though only one may be illustrated). The two spring bars 110a and 110b straddle hitch coupler 108, and the brackets 112a and 112b are disposed and secured on opposing sides of the trailer frame 106. The brackets 112a and 112b may be formed in various shapes and can include an L-shaped bracket which can include a substantially planer flange 114, which can enable the spring bar 110a to rest firmly thereon, during use. The brackets 112a and 112b may also be integral with the trailer frame 106 or can be removably coupled thereto as shown in FIG. 1 which illustrates a plurality of removable bolts 116, which can be used to secure the brackets 112a and 112b to the trailer frame.

The flange 114 also provides a contact surface with the spring bars 112a and 112b resulting in a loading force between the trailer and the tow vehicle. The spring bars 112a and 112b can help equalize and redistribute the load or weight of the trailer frame 106 (and any contents within the trailer) to move evenly balance the load between the axles of the tow vehicle and the trailer.

Figure 3:
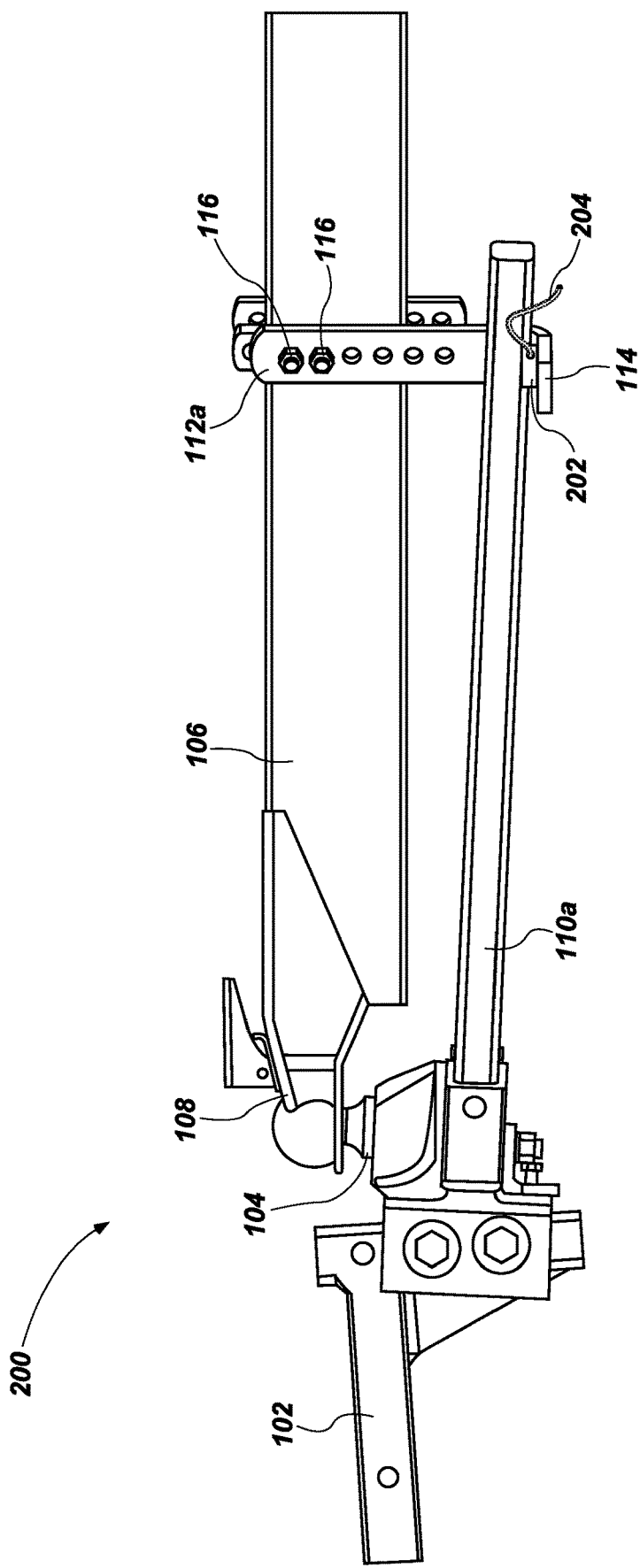
FIG. 3 is a perspective side view of another embodiment of an embodiment of a trailer force measurement system according to the present disclosure.
Figure 4:
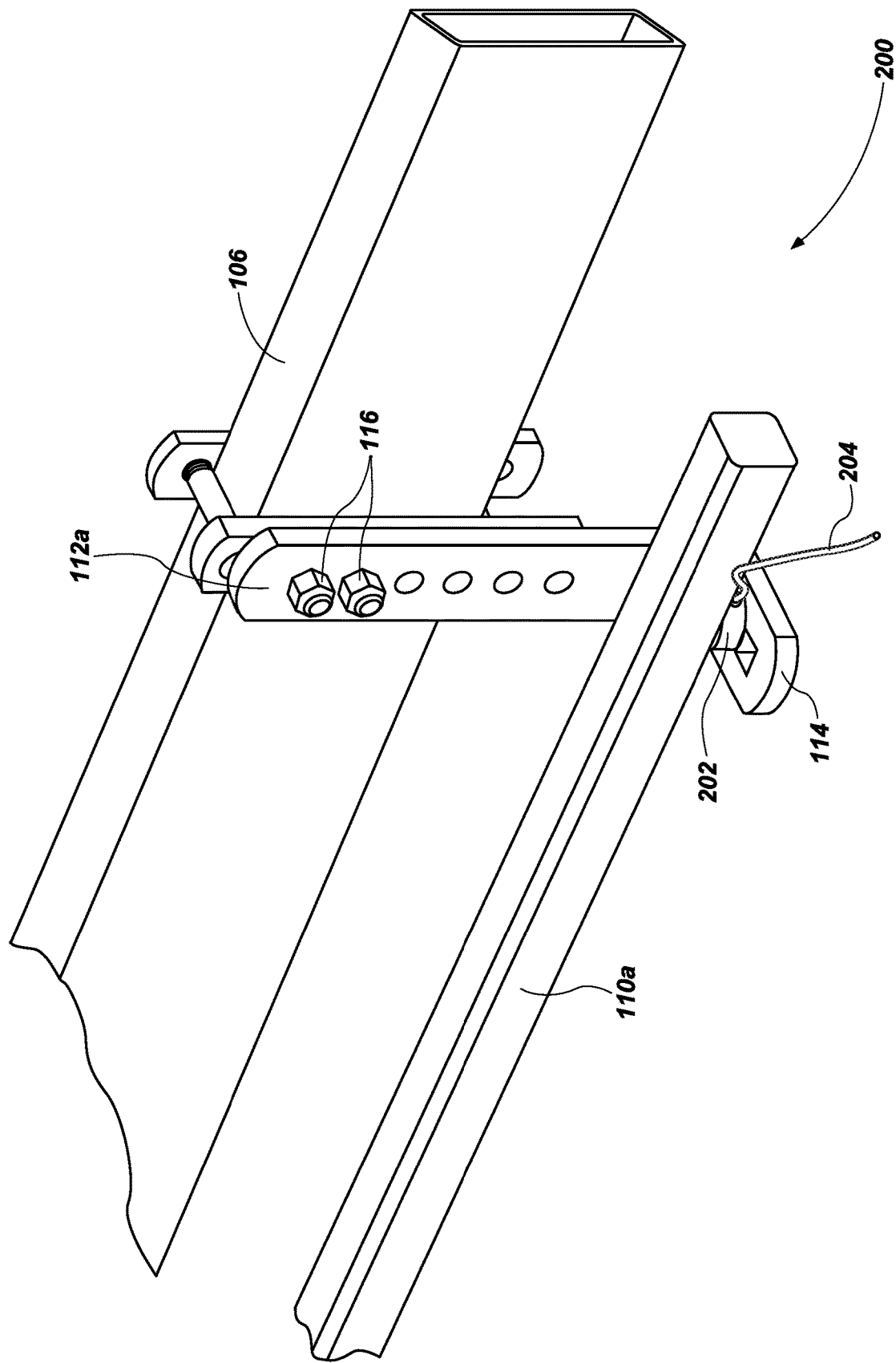
FIG. 4 is a zoomed-in perspective side view of the embodiment of FIG. 3.

FIGS. 3 and 4 illustrate an embodiment of a force measurement system 200 which includes the weight distribution hitch 102, ball mount 104, trailer frame 106, hitch coupler 108 and the spring bars 110a and 110b, and the brackets 112a and 112b as described in more detail above. The force measurement system also includes a force measurement device, such as a load cell 202, or transducer, which can be mounted, either permanently or removably, to (or otherwise disposed on) the bracket 112a (and similarly with a corresponding load cell on bracket 112b, not shown) on the flange 114. The spring bar 110a rests on the load cell 202 and thus exerts a compression force (or equalization force) on the load cell 202 and the bracket 112a. The load cell 202 can be configured to measure the force being exerted by the spring bar 110a, which is based upon the load of the trailer frame 106 (and the contents therein). The greater the load or weight of the trailer or trailer frame 106, the greater the equalization force exerted by the spring bar 112a on the bracket 112a.

The load cell 202 can also be configured to measure the compression force, strain, displacement or pressure, and then transmit the measurement(s) to a display (not shown) via wired connection 204. Alternatively, the load cell 202 may transmit information wirelessly to a remote display. These measurements can then provide or be used to calculate the force of distributing the trailer tongue load across the tow vehicle and the trailer, or over all axles, and enable a user to more safely load, set up, and drive a tow vehicle and trailer (trailer frame 106) combination.

Figure 5:
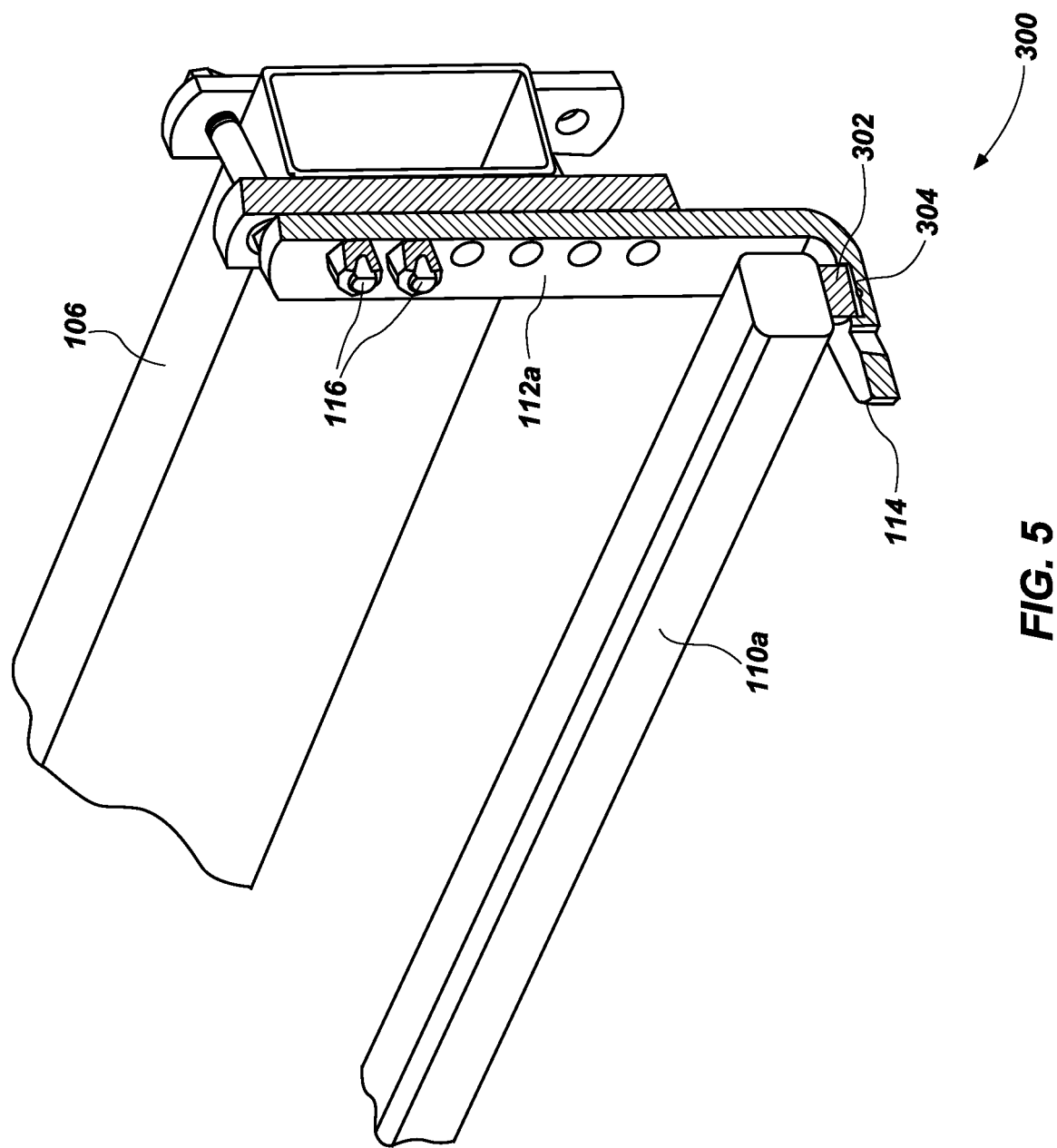
FIG. 5 is a perspective side view of another embodiment of an embodiment of a trailer force measurement system according to the present disclosure.
Figure 6:
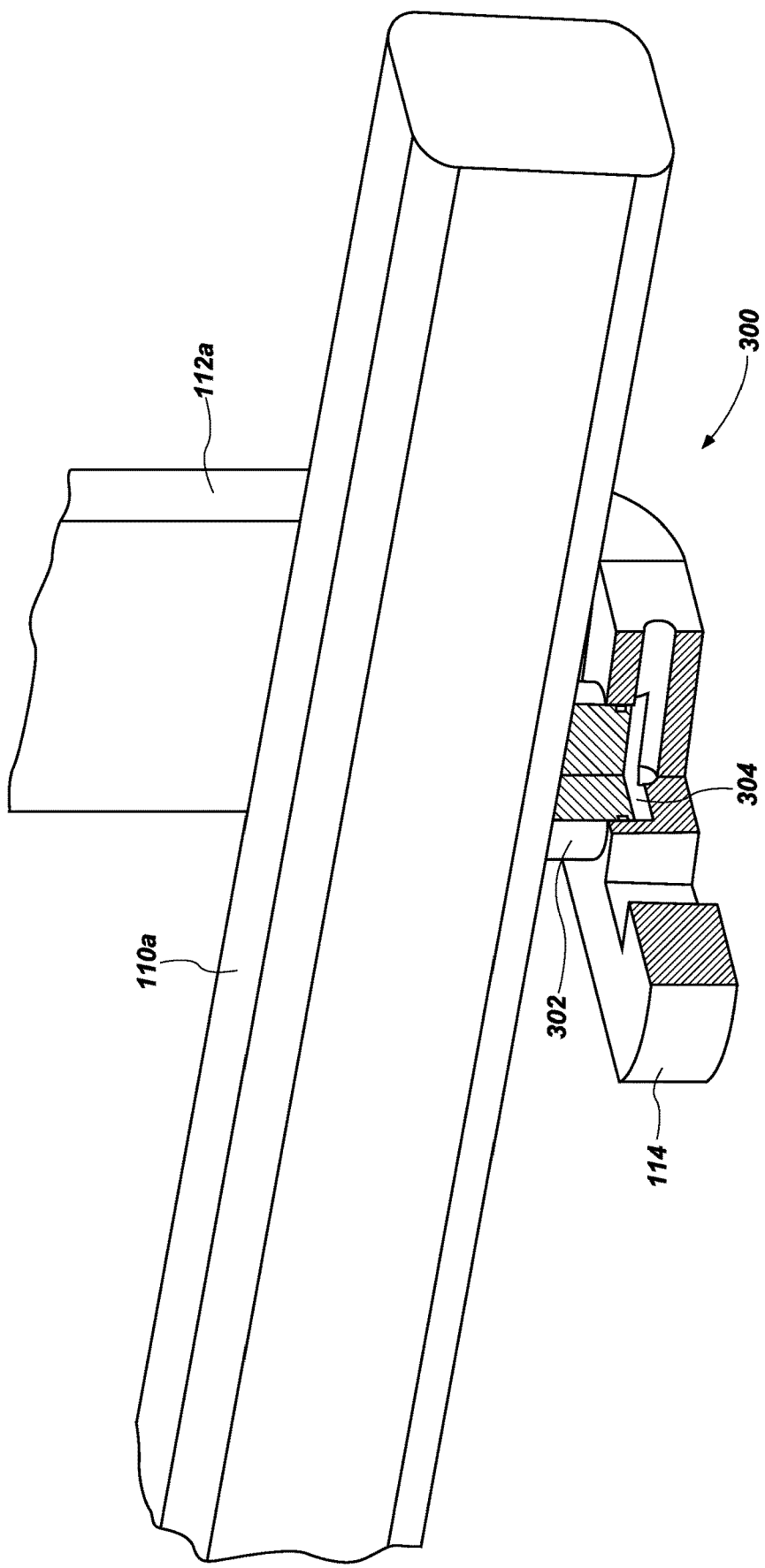
FIG. 6 is a zoomed-in, partially cutaway, perspective side view of the embodiment of FIG. 5.

FIGS. 5 and 6 illustrate an embodiment of a force measurement system 300 which includes the weight distribution hitch 102, ball mount 104, trailer frame 106, hitch coupler 108 and the spring bars 110a and 110b, and the brackets 112a and 112b (some of which are not shown), as described in more detail above. The force measurement system 300 also includes a force measurement device, such as a hydraulic piston 302 housed within a fluid chamber 304, which can be mounted, either permanently or removably, to (or otherwise disposed on) the bracket 112a (and similarly with a corresponding piston and fluid chamber on bracket 112b, not shown) on the flange 114. The spring bar 110a rests on the piston 302 and thus exerts a compression force (or equalization force) on the piston 302 and the bracket 112a. The piston 302 which displaces within the fluid chamber 304 with the presence of a compression force, can be configured to measure the force being exerted by the spring bar 110a, which is based upon the load of the trailer frame 106 (and the contents therein). The greater the load or weight of the trailer or trailer frame 106, the greater the equalization force exerted by the spring bar 112a on the bracket 112a.

The piston 302 displacement within the fluid chamber 304 can be configured to measure the compression force, displacement or pressure, and then a user can visibly record or observe the corresponding measurement. In other embodiments, the piston 302 displacement can be detected by a sensor and the measurement can be transmitted to a display (not shown) via wired or wireless connection. These measurements can then provide or be used to calculate the force of distributing the trailer tongue load across the tow vehicle and the trailer, or over all axles, and enable a user to more safely load, set up, and drive a tow vehicle and trailer (trailer frame 106) combination.

Figure 7:
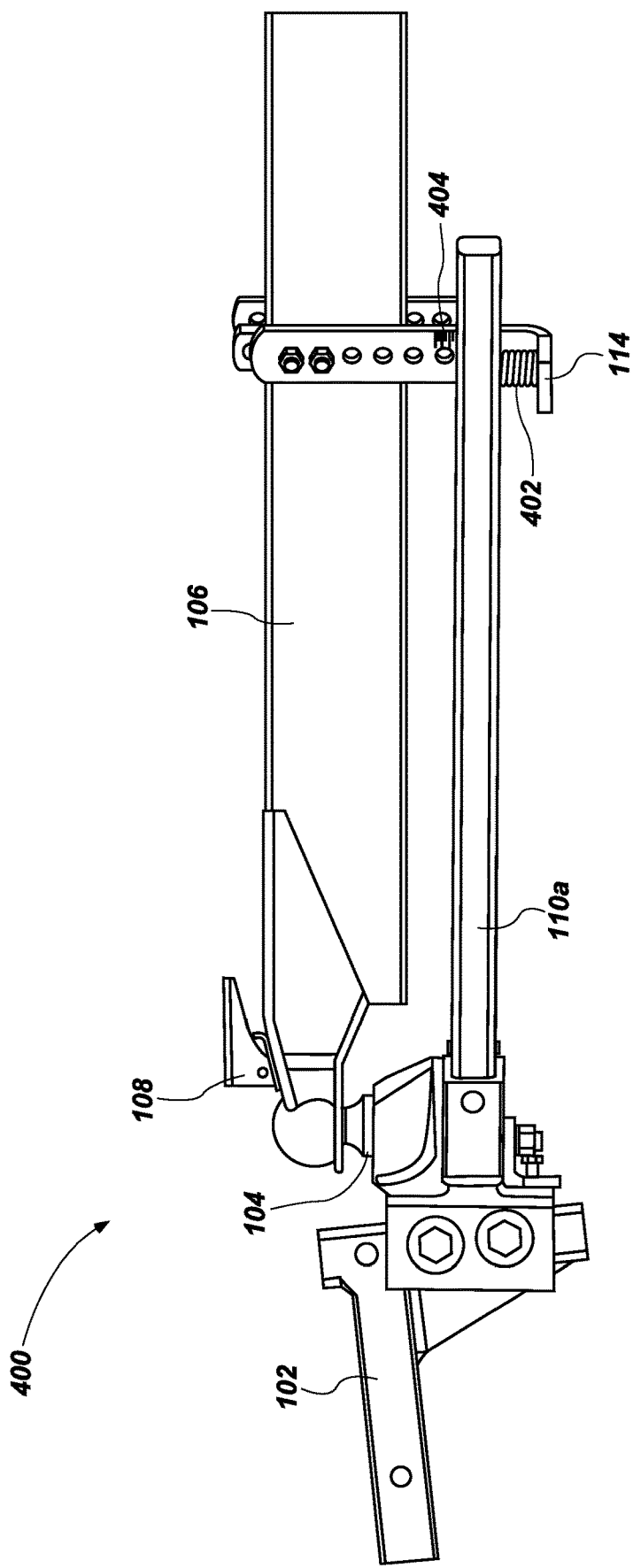
FIG. 7 is a perspective side view of another embodiment of an embodiment of a trailer force measurement system according to the present disclosure.
Figure 8:
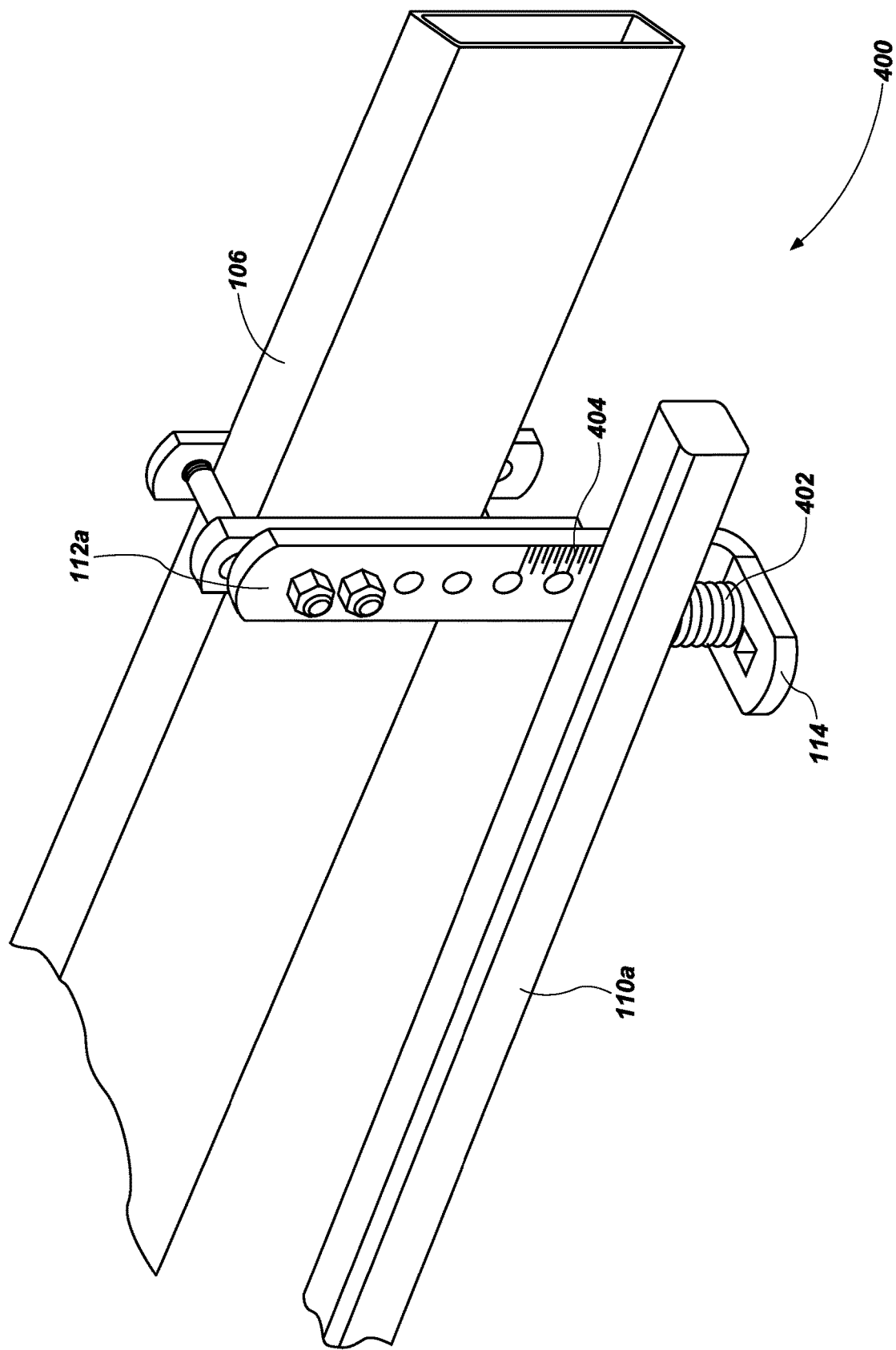
FIG. 8 is a zoomed-in perspective side view of the embodiment of FIG. 7.

FIGS. 7 and 8 illustrate an embodiment of a force measurement system 400 which includes the weight distribution hitch 102, ball mount 104, trailer frame 106, hitch coupler 108 and the spring bars 110a and 110b, and the brackets 112a and 112b as described in more detail above. The force measurement system 400 also includes a force measurement device, such as a coil spring 402, or other desired compression spring, which can be mounted, either permanently or removably, to (or otherwise disposed on) the bracket 112a (and similarly with a corresponding coil spring on bracket 112b, not shown) on the flange 114. The spring bar 110a rests on the coil spring 402 and thus exerts a compression force (or equalization force) on the coil spring 402 and the bracket 112a.

The coil spring 402 can be configured to measure the force being exerted by the spring bar 110a, which is based upon the load of the trailer frame 106 (and the contents therein), with the use of a measurement scale 404 which can be used to measure the displacement of the coil spring 402 under a compression force. The measurement scale 404 can be integral with the bracket 112a or can be removably fixed to (or otherwise disposed on) the bracket 112a. The greater the load or weight of the trailer or trailer frame 106, the greater the equalization force exerted by the spring bar 112a on the bracket 112a.

The coil spring can also be configured to measure a compression force, displacement or pressure, and then a user can visually identify the displacement of the coil spring 402 and determine the corresponding force being exerted. These measurements can then provide or be used to calculate the force of distributing the trailer tongue load across the tow vehicle and the trailer, or over all axles, and enable a user to more safely load, set up, and drive a tow vehicle and trailer (trailer frame 106) combination.

Figure 9:
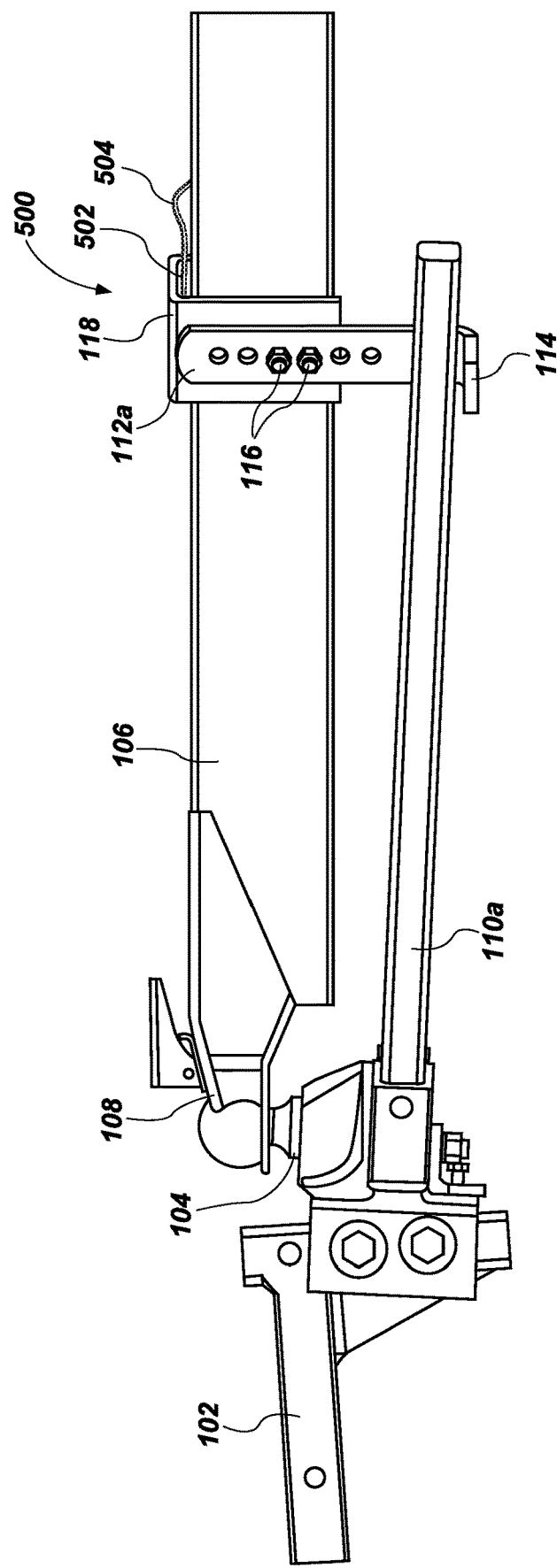
FIG. 9 is a perspective side view of another embodiment of an embodiment of a trailer force measurement system according to the present disclosure.
Figure 10:
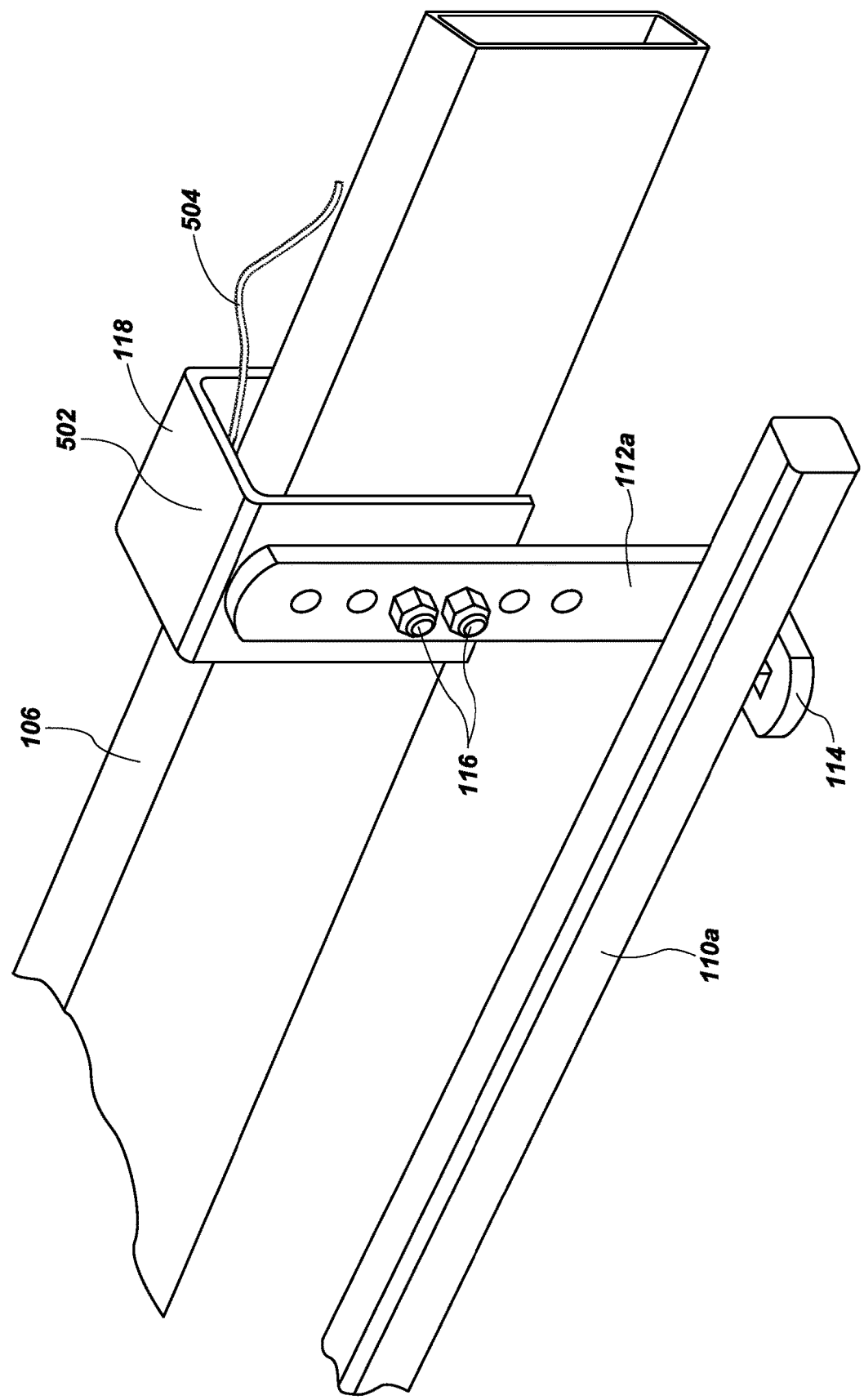
FIG. 10 is a zoomed-in perspective side view of the embodiment of FIG. 9.

FIGS. 9 and 10 illustrate an embodiment of a force measurement system 500 which includes the weight distribution hitch 102, ball mount 104, trailer frame 106, hitch coupler 108 and the spring bars 110a and 110b, and the brackets 112a and 112b as described in more detail above. The force measurement system 500 also includes a bracket coupler 118 which can include a U-shaped structure formed to receive at least a portion of the trailer frame 106, such that the bracket coupler 118 is slidably engaged with the trailer frame 106 and free to move vertically with respect to the trailer frame 106, while maintaining engagement with the trailer frame 106. The bracket 112a is removably fixed to (or otherwise disposed on) the bracket coupler via bolts 116, thus any compression forces exerted by the spring bar 110a onto the flange 114 of the bracket 112a can also be measured between a interior surface of the bracket coupler 118 and a top surface of the trailer frame 106.

Force measurement system 500 also includes a force measurement device, such as a load cell 502, or transducer, which can be mounted, either permanently or removably, to (or otherwise disposed on) a top surface of the trailer frame 106 (and similarly with a corresponding bracket coupler and load cell relative to bracket 112b, not shown) and directly beneath an interior surface of the bracket coupler 118. Therefore, when the spring bar 110a rests on flange 114 and thus exerts a compression force (or equalization force), a corresponding force will be exerted on the load cell 502 between the bracket coupler 118 and the trailer frame 106a.

The load cell 202 can be configured to measure the force being exerted by the spring bar 110a, which is based upon the load of the trailer frame 106 (and the contents therein). The greater the load or weight of the trailer or trailer frame 106, the greater the equalization force exerted by the spring bar 112a on the bracket 112a.

The load cell 502 can also be configured to measure the compression force, strain, displacement or pressure, and then transmit the measurement(s) to a display (not shown) via wired connection 504. Alternatively, the load cell 502 may transmit information wirelessly to a remote display. These measurements can then provide or be used to calculate the force of distributing the trailer tongue load across the tow vehicle and the trailer, or over all axles, and enable a user to more safely load, set up, and drive a tow vehicle and trailer (trailer frame 106) combination.

Figure 11:
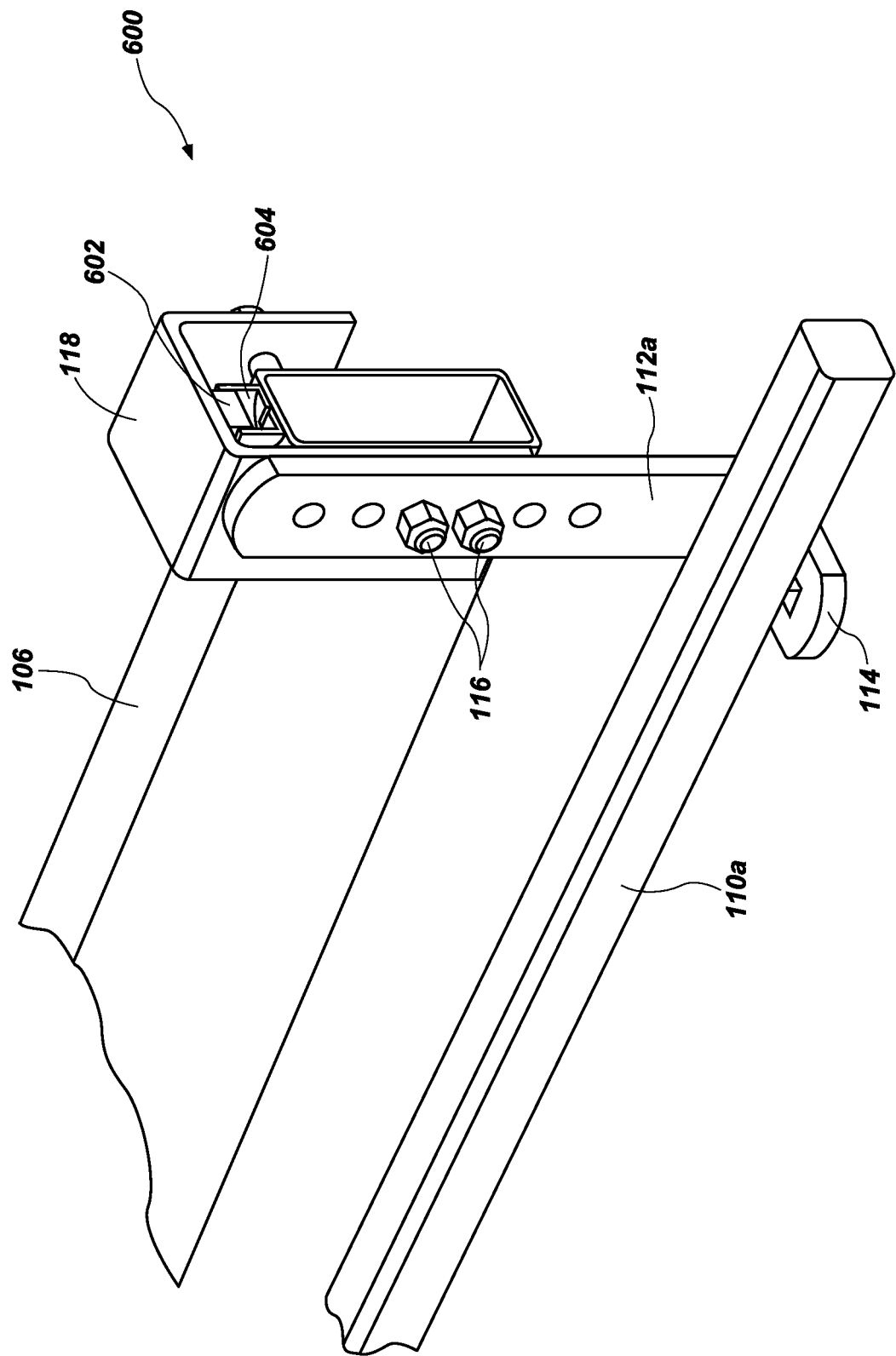
FIG. 11 is a perspective side view of another embodiment of an embodiment of a trailer force measurement system according to the present disclosure.

FIG. 11 illustrates an embodiment of a force measurement system 300 which includes the weight distribution hitch 102, ball mount 104, trailer frame 106, hitch coupler 108 and the spring bars 110a and 110b, and the brackets 112a and 112b (some of which are not shown), as described in more detail above. The force measurement system 600 also includes a bracket coupler 118 which can include a U-shaped structure formed to receive at least a portion of the trailer frame 106, such that the bracket coupler is free to move vertically with respect to the trailer frame 106, while maintaining engagement with the trailer frame 106. The bracket 112a is removably fixed to (or otherwise disposed on) the bracket coupler via bolts 116, thus any compression forces exerted by the spring bar 110a onto the flange 114 of the bracket 112a can also be measured between a interior surface of the bracket coupler 118 and a top surface of the trailer frame 106.

Force measurement system 600 also includes a force measurement device, such as a hydraulic piston 602 housed within a fluid chamber 604, which can be mounted, either permanently or removably, to (or otherwise disposed on) a top surface of the trailer frame 106 (and similarly with a corresponding bracket coupler and load cell relative to bracket 112b, not shown) and directly beneath an interior surface of the bracket coupler 118. Therefore, when the spring bar 110a rests on flange 114 and thus exerts a compression force (or equalization force), a corresponding force will be exerted on the piston 602 between the bracket coupler 118 and the trailer frame 106a. The piston 602 which displaces within the fluid chamber 304 with the presence of a compression force, can be configured to measure the force being exerted by the spring bar 110a, which is based upon the load of the trailer frame 106 (and the contents therein). The greater the load or weight of the trailer or trailer frame 106, the greater the equalization force exerted by the spring bar 112a on the bracket 112a.

The piston 602 displacement within the fluid chamber 304 can be configured to measure the compression force, displacement or pressure, and then a user can visibly record or observe the corresponding measurement. In other embodiments, the piston 602 displacement can be detect by a sensor and the measurement can be transmitted to a display (not shown) via wired or wireless connection. These measurements can then provide or be used to calculate the force of distributing the trailer tongue load across the tow vehicle and the trailer, or over all axles, and enable a user to more safely load, set up, and drive a tow vehicle and trailer (trailer frame 106) combination.

Figure 12:
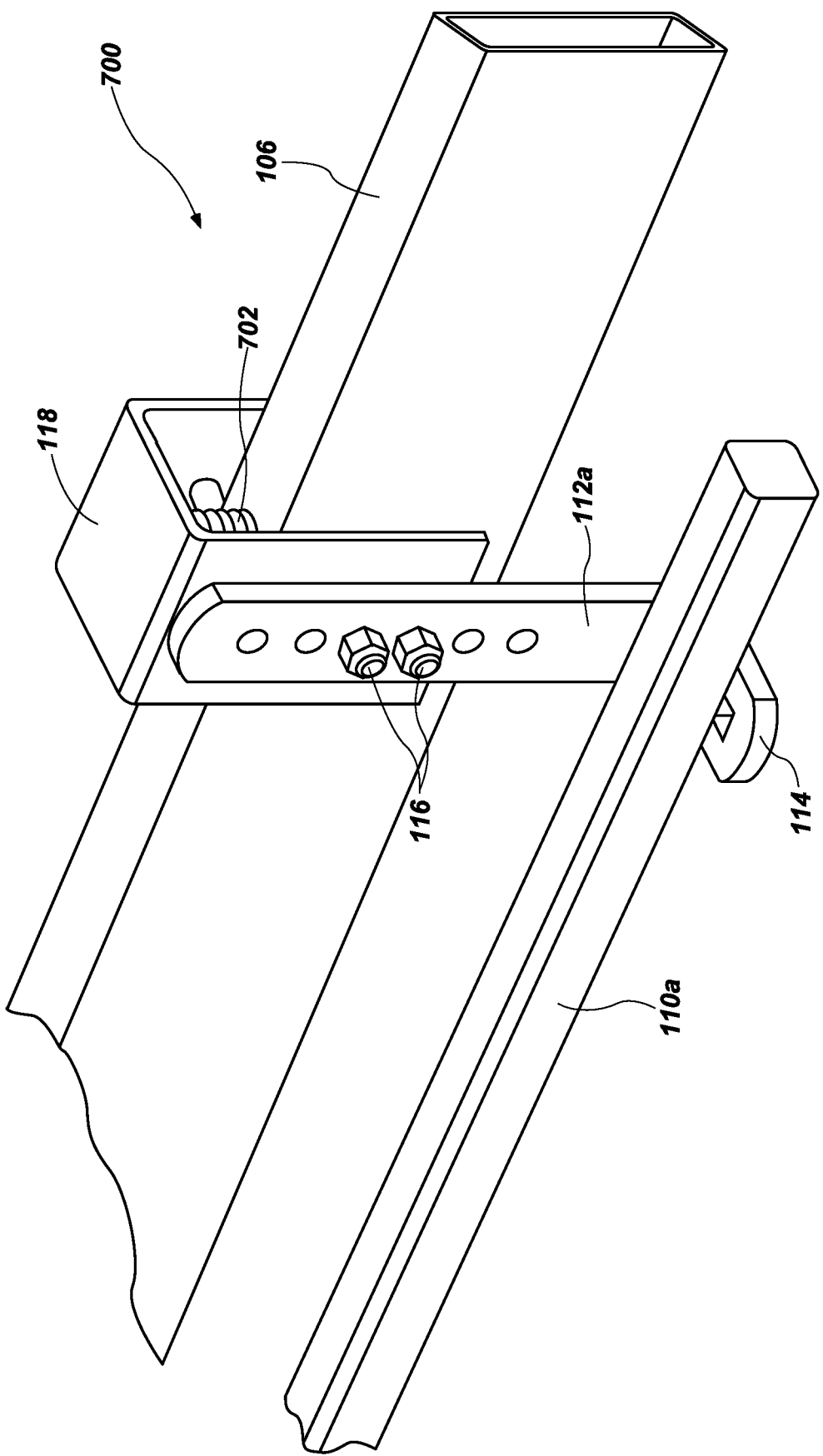
FIG. 12 is a perspective side view of another embodiment of an embodiment of a trailer force measurement system according to the present disclosure.

FIG. 12 illustrate an embodiment of a force measurement system 400 which includes the weight distribution hitch 102, ball mount 104, trailer frame 106, hitch coupler 108 and the spring bars 110a and 110b, and the brackets 112a and 112b as described in more detail above. The force measurement system 700 also includes a bracket coupler 118 which can include a U-shaped structure formed to receive at least a portion of the trailer frame 106, such that the bracket coupler is free to move vertically with respect to the trailer frame 106, while maintaining engagement with the trailer frame 106. The bracket 112a is removably fixed to (or otherwise disposed on) the bracket coupler via bolts 116, thus any compression forces exerted by the spring bar 110a onto the flange 114 of the bracket 112a can also be measured between a interior surface of the bracket coupler 118 and a top surface of the trailer frame 106.

The force measurement system 700 also includes a force measurement device, such as a coil spring 702, or other desired compression spring, which can be mounted, either permanently or removably, to (or otherwise disposed on) a top surface of the trailer frame 106 (and similarly with a corresponding bracket coupler and load cell relative to bracket 112b, not shown) and directly beneath an interior surface of the bracket coupler 118. Therefore, when the spring bar 110a rests on flange 114 and thus exerts a compression force (or equalization force), a corresponding force will be exerted on the coil spring 702 between the bracket coupler 118 and the trailer frame 106a.

The coil spring 702 can be configured to measure the force being exerted by the spring bar 110a, which is based upon the load of the trailer frame 106 (and the contents therein), with the use of a measurement scale can be used to measure the displacement of the coil spring 702 under a compression force. The measurement scale 404 can be integral with the bracket coupler 118 or can be removably fixed to (or otherwise disposed on) the bracket coupler 118. The greater the load or weight of the trailer or trailer frame 106, the greater the equalization force exerted by the spring bar 112a on the bracket 112a.

The coil spring 702 can also be configured to measure a compression force, displacement or pressure, and then a user can visually identify the displacement of the coil spring 702 and determine the corresponding force being exerted. These measurements can then provide or be used to calculate the force of distributing the trailer tongue load across the tow vehicle and the trailer, or over all axles, and enable a user to more safely load, set up, and drive a tow vehicle and trailer (trailer frame 106) combination.

Figure 13:
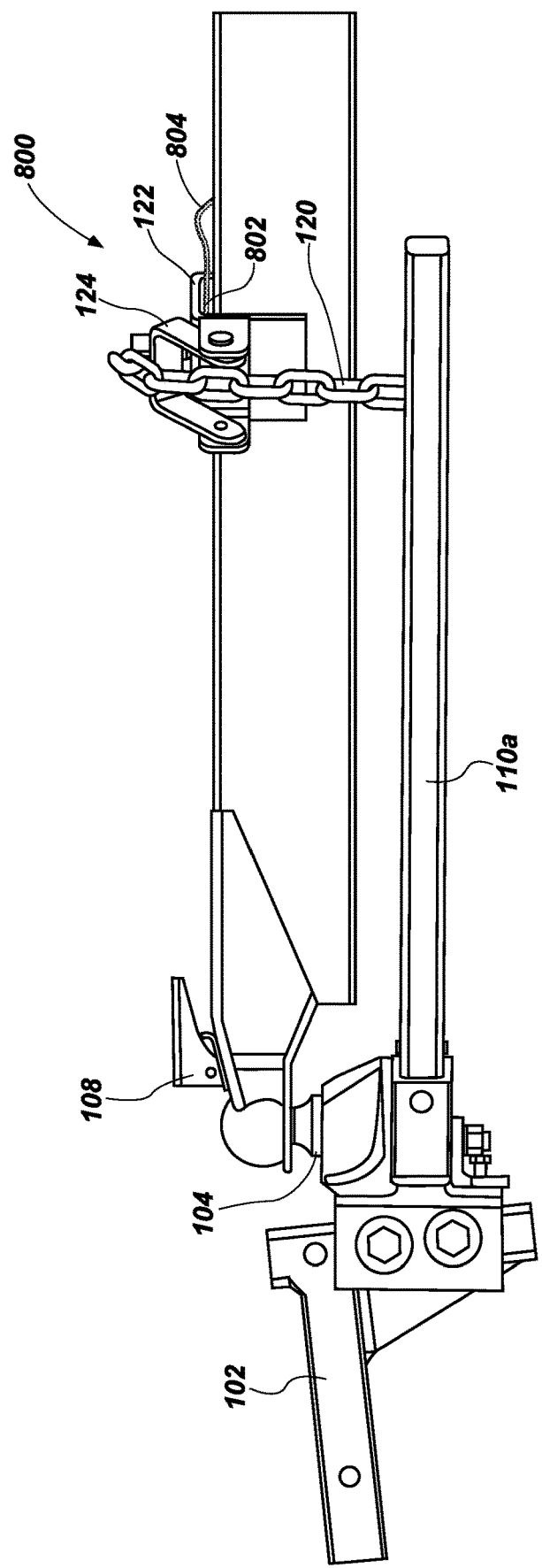
FIG. 13 is a perspective side view of another embodiment of an embodiment of a trailer force measurement system according to the present disclosure.
Figure 14:
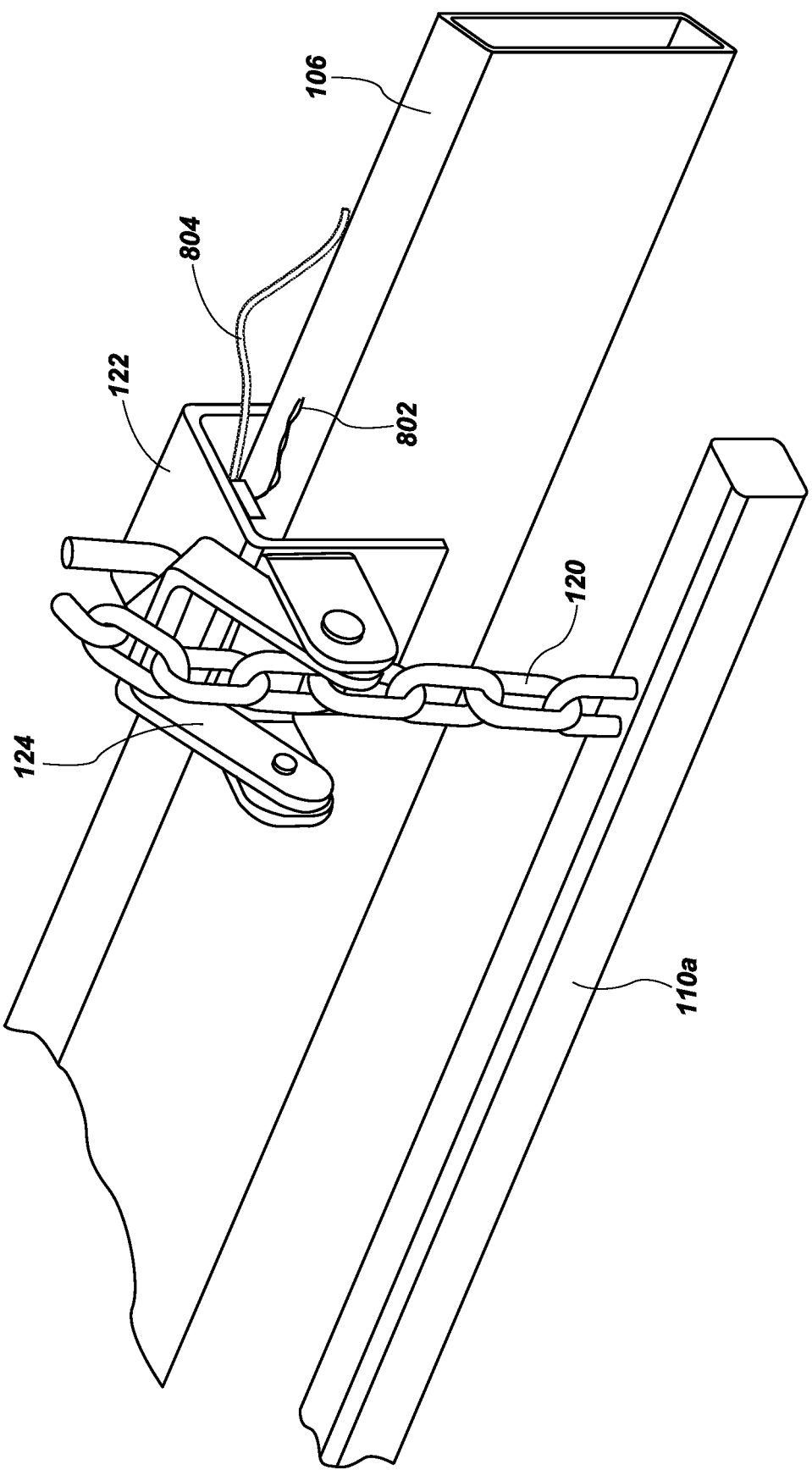
FIG. 14 is a zoomed-in perspective side view of the embodiment of FIG. 13.

FIGS. 13 and 14 illustrate an embodiment of a force measurement system 800 which includes the weight distribution hitch 102, ball mount 104, trailer frame 106, hitch coupler 108 and spring bars 110a and 110b, as described in more detail above. The force measurement system 800 also includes a flexible line 120 attached to a bracket coupler 122 which can include a U-shaped structure formed to receive at least a portion of the trailer frame 106, such that the bracket coupler 122 is free to move vertically with respect to the trailer frame 106, while maintaining engagement with the trailer frame 106. The flexible line 120 is removably fixed to (or otherwise disposed on) the bracket coupler 122 via latch 124, thus any tension forces exerted by the spring bar 110a onto the flexible line 120 can also be measured between a interior surface of the bracket coupler 122 and a top surface of the trailer frame 106. The flexible line 120 can be a chain, cord, rope or other desired line.

Force measurement system 800 also includes a force measurement device, such as a load cell 802, or transducer, which can be mounted, either permanently or removably, to (or otherwise disposed on) a top surface of the trailer frame 106 (and similarly with a corresponding bracket coupler and load cell relative to bracket 112b, not shown) and directly beneath an interior surface of the bracket coupler 118. Therefore, when the spring bar 110a pulls on the flexible line 120 and thus exerts a tension force, a corresponding compression force will be exerted on the load cell 802 between the bracket coupler 122 and the trailer frame 106.

The load cell 802 can be configured to measure the force being exerted by the spring bar 110a, which is based upon the load of the trailer frame 106 (and the contents therein). The greater the load or weight of the trailer or trailer frame 106, the greater the force exerted by the spring bar 112a on the flexible line 120a.

The load cell 802 can also be configured to measure the compression force, strain, displacement or pressure, and then transmit the measurement(s) to a display (not shown) via wired connection 804. Alternatively, the load cell 802 may transmit information wirelessly to a remote display. These measurements can then provide or be used to calculate the force of distributing the trailer tongue load across the tow vehicle and the trailer, or over all axles, and enable a user to more safely load, set up, and drive a tow vehicle and trailer (trailer frame 106) combination.

Figure 15:
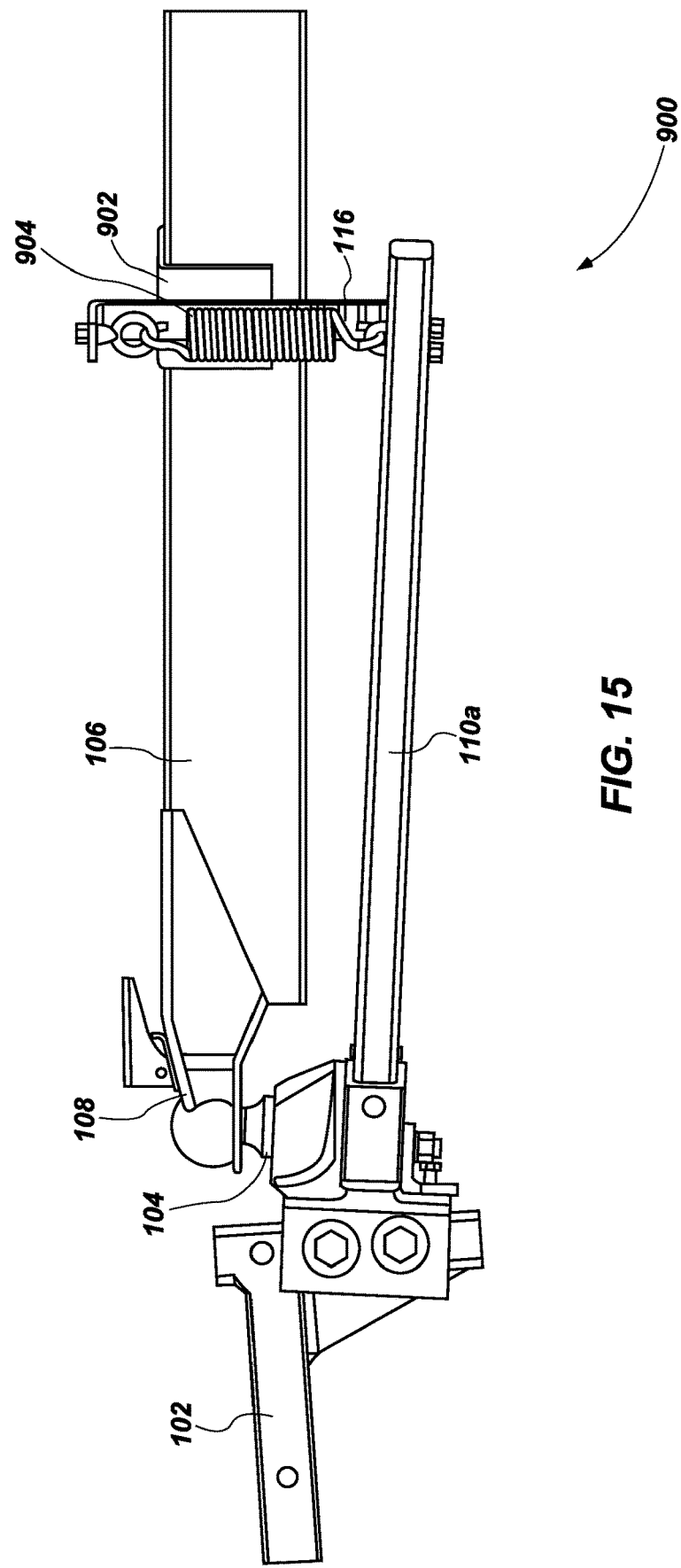
FIG. 15 is a perspective side view of another embodiment of an embodiment of a trailer force measurement system according to the present disclosure.
Figure 16:
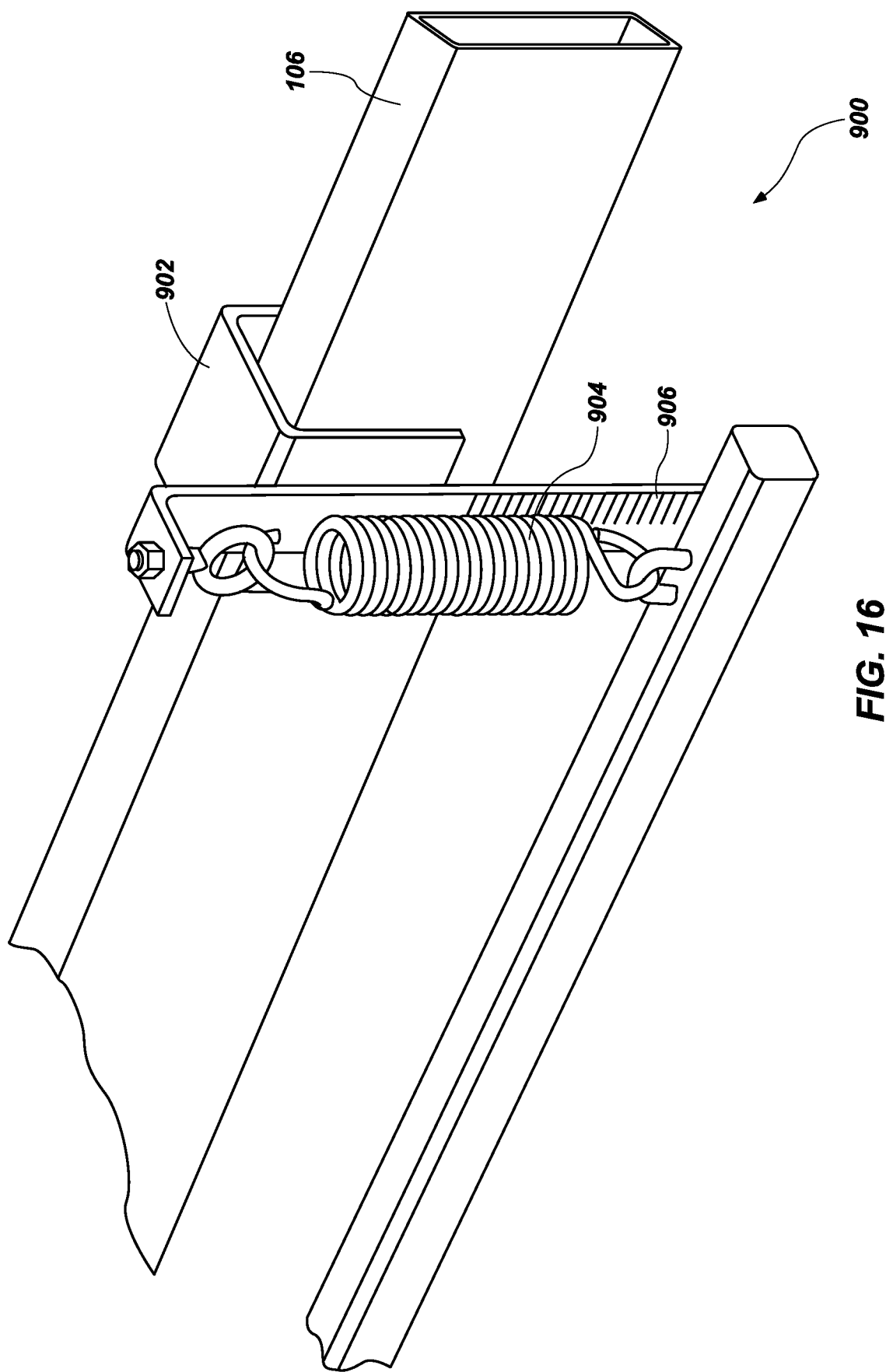
FIG. 16 is a zoomed-in perspective side view of the embodiment of FIG. 15.

FIGS. 15 and 16 illustrate an embodiment of a force measurement system 900 which includes the weight distribution hitch 102, ball mount 104, trailer frame 106, hitch coupler 108 and the spring bars 110a and 110b, as described in more detail above. The force measurement system 900 also includes a bracket 902 which can be fixed, or removably coupled, to (or otherwise disposed on) the trailer frame 106. The bracket 902 may be U-shaped, to receive and form a stronger connection with the trailer frame 106. The force measurement system 900 also includes a force measurement device, such as a tension spring 904, or other desired tension measurement device, which can be coupled, either permanently or removably, to both the bracket 902 and the spring bar 110a (and similarly with a corresponding tension spring coupled to spring bar 110b, not shown). The spring bar 110a exerts a tension force and pulls on the tension spring 904 and thus exerts a tension force (or equalization force).

The tension spring 904 can be configured to measure the force being exerted by the spring bar 110a, which is based upon the load of the trailer frame 106 (and the contents therein), with the use of a measurement scale 906 which can be used to measure the displacement of the tension spring 904 under a tension force. The measurement scale 906 can be integral with the bracket 902 or can be removably fixed to (or otherwise disposed on) the bracket 902. The greater the load or weight of the trailer or trailer frame 106, the greater the equalization force exerted by the spring bar 112a on the tension spring 904.

The tension spring 904 can also be configured to measure a tension force, displacement, or pressure, and then a user can visually identify the displacement of the tension spring 904 and determine the corresponding force being exerted.

These measurements can then provide or be used to calculate the force of distributing the trailer tongue load across the tow vehicle and the trailer, or over all axles, and enable a user to more safely load, set up, and drive a tow vehicle and trailer (trailer frame 106) combination.

Figure 17:
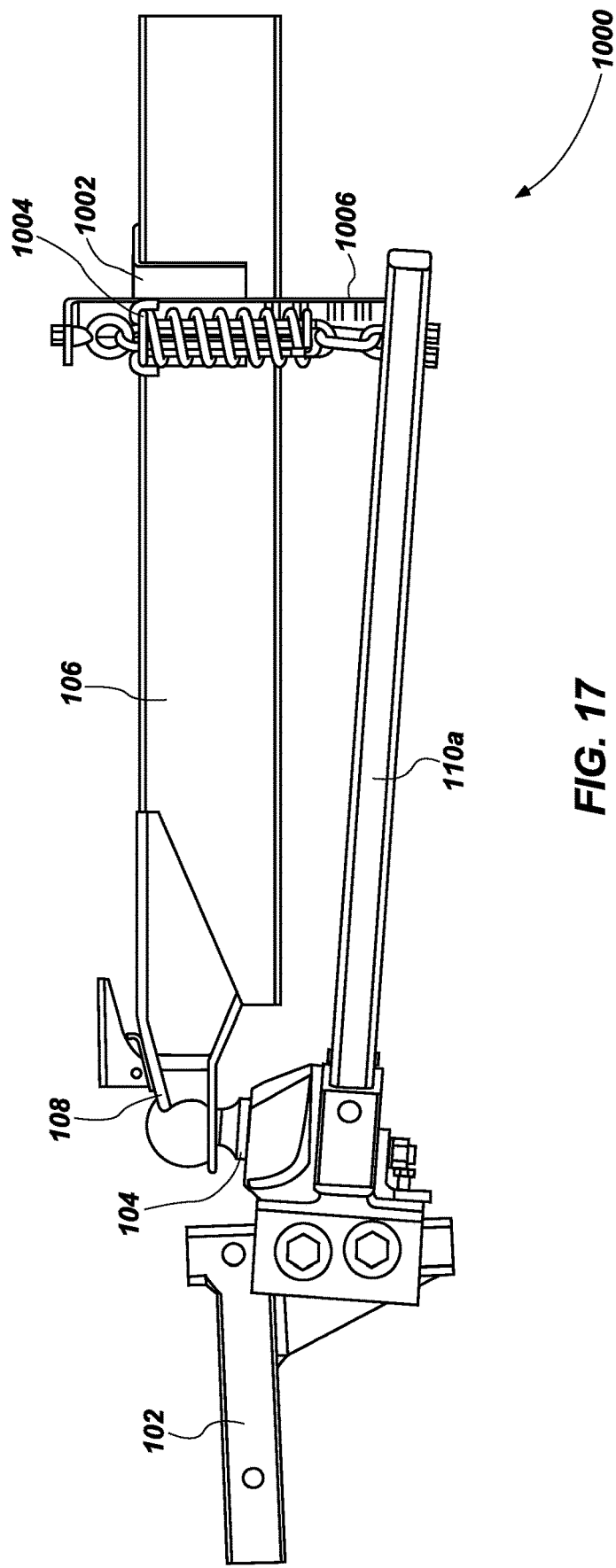
FIG. 17 is a perspective side view of another embodiment of an embodiment of a trailer force measurement system according to the present disclosure.
Figure 18:
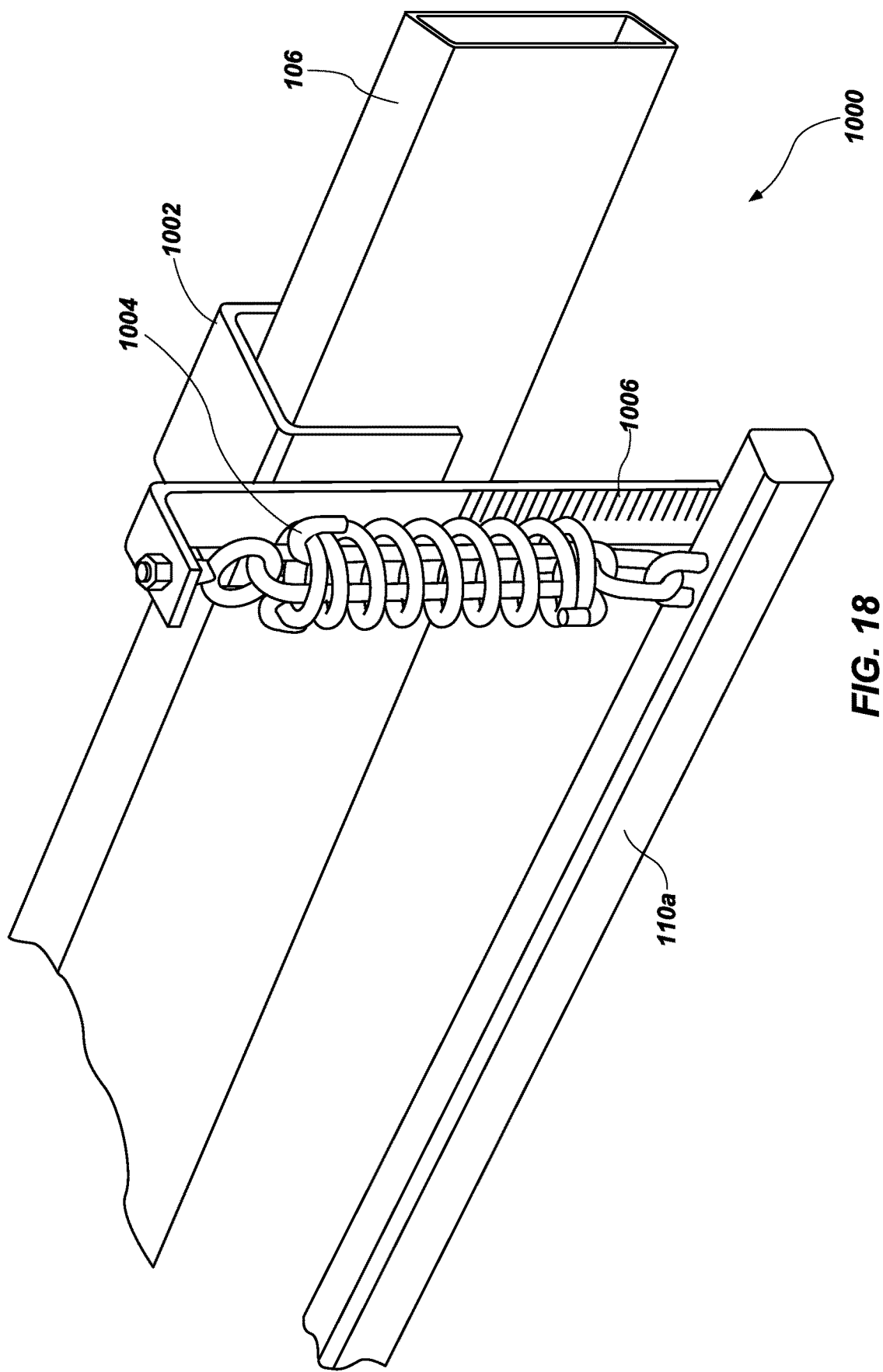
FIG. 18 is a zoomed-in perspective side view of the embodiment of FIG. 17.

FIGS. 17 and 18 illustrate an embodiment of a force measurement system 1000 which includes the weight distribution hitch 102, ball mount 104, trailer frame 106, hitch coupler 108 and the spring bars 110a and 110b, as described in more detail above. The force measurement system 1000 also includes a bracket 1002 which can be fixed, or removably coupled, to (or otherwise disposed on) the trailer frame 106. The bracket 1002 may be U-shaped, to receive and form a stronger connection with the trailer frame 106. The force measurement system 1000 also includes a force measurement device, such as a coil spring 1004, or other desired spring device, which can be coupled, either permanently or removably, to both the bracket 1002 and the spring bar 110a (and similarly with a corresponding coil spring coupled to spring bar 110b, not shown). The spring bar 110a exerts a tension force and pulls on the coil spring 1004 and thus exerts a tension force (or equalization force).

The coil spring 1004 can be configured to measure the force being exerted by the spring bar 110a, which is based upon the load of the trailer frame 106 (and the contents therein), with the use of a measurement scale 1006 which can be used to measure the displacement of the coil spring 1004 under a tension force. The measurement scale 1006 can be integral with the bracket 1002 or can be removably fixed to (or otherwise disposed on) the bracket 1002. The greater the load or weight of the trailer or trailer frame 106, the greater the equalization force exerted by the spring bar 112a on the tension spring 1004.

The coil spring 1004 can also be configured to measure a tension force, displacement, or pressure, and then a user can visually identify the displacement of the coil spring 1004 and determine the corresponding force being exerted. These measurements can then provide or be used to calculate the force of distributing the trailer tongue load across the tow vehicle and the trailer, or over all axles, and enable a user to more safely load, set up, and drive a tow vehicle and trailer (trailer frame 106) combination.

Figure 19:
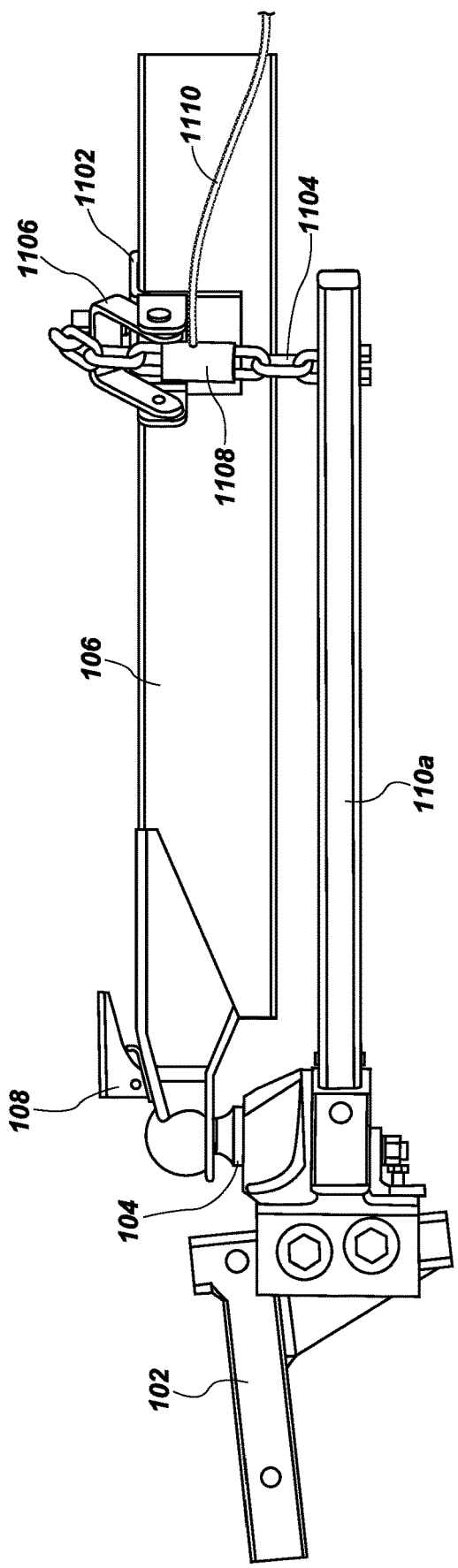
FIG. 19 is a perspective side view of another embodiment of an embodiment of a trailer force measurement system according to the present disclosure.
Figure 20:
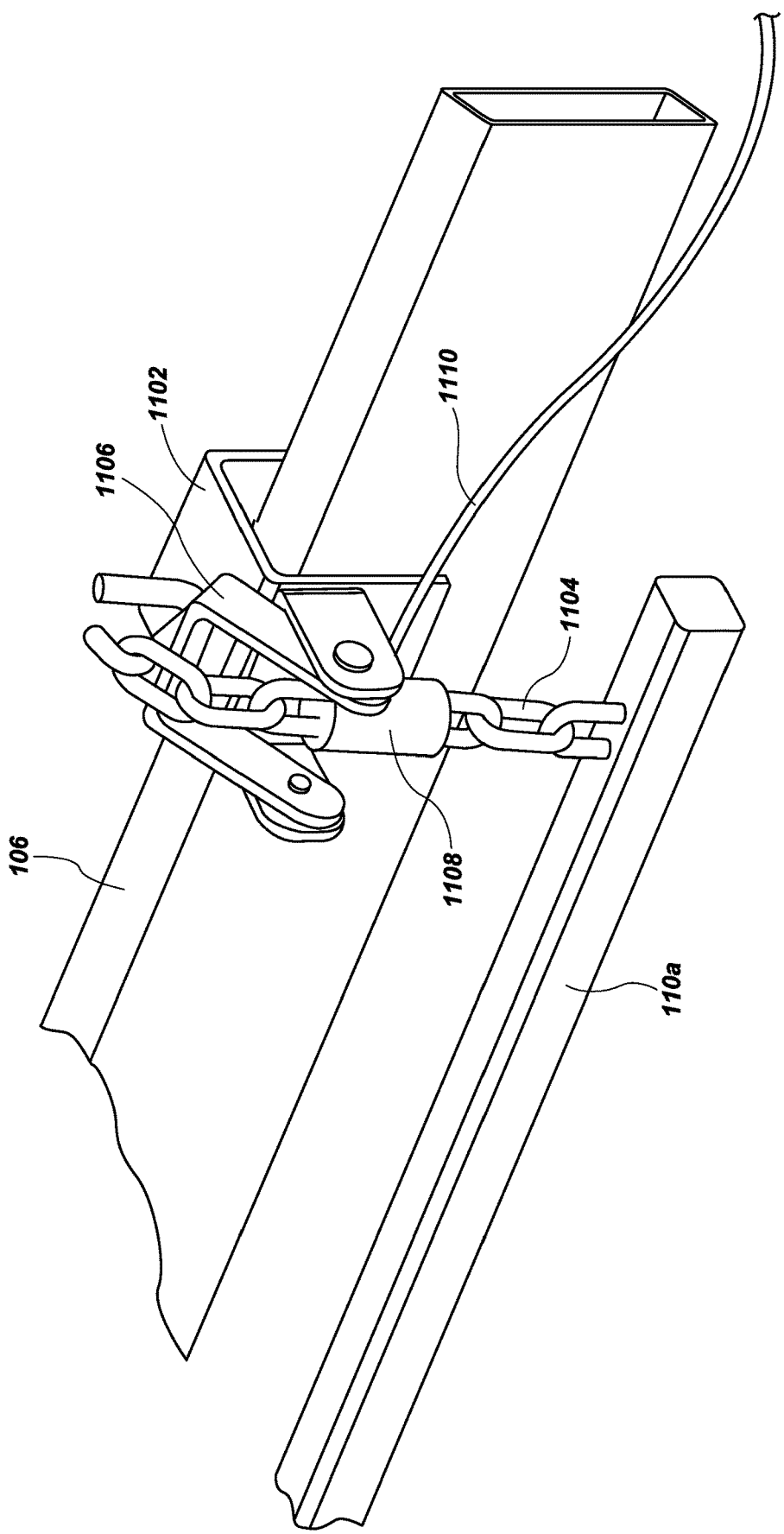
FIG. 20 is a zoomed-in perspective side view of the embodiment of FIG. 19.

FIGS. 19 and 20 illustrate an embodiment of a force measurement system 1100 which includes the weight distribution hitch 102, ball mount 104, trailer frame 106, hitch coupler 108 and the spring bars 110a and 110b, as described in more detail above. The force measurement system 1100 also includes a bracket 1102 which can be fixed, or removably coupled, to (or otherwise disposed on) the trailer frame 106. The bracket 1102 may be U-shaped, to receive and form a stronger connection with the trailer frame 106. The force measurement system 1100 also includes a flexible line 1104 attached to both the spring bar 110a and the bracket 1102. The flexible line 1104 is removably fixed to (or otherwise disposed on) the bracket 1102 via latch 1006, which can be secured to the bracket 1102. The flexible line 1104 can be a chain, cord, rope or other desired line.

Force measurement system 1100 also includes a force measurement device, such as a load cell 1108, or transducer, which can be mounted or integrated, either permanently or removably, to (or otherwise disposed on) the flexible line 1104 (and similarly with a corresponding bracket and load cell relative to spring bar 110b, not shown). Therefore, when the spring bar 110a pulls on the flexible line 1104 and thus exerts a tension force, then load cell 1108, integrated with the flexible line 1104, can measure the corresponding force.

The load cell 1108 can be configured to measure the force being exerted by the spring bar 110a, which is based upon the load of the trailer frame 106 (and the contents therein). The greater the load or weight of the trailer or trailer frame 106, the greater the force exerted by the spring bar 110a on the flexible line 1104.

The load cell 1108 can also be configured to measure the tension force, strain, displacement or pressure, and then transmit the measurement(s) to a display (not shown) via wired connection 1110. Alternatively, the load cell 1108 may transmit information wirelessly to a remote display. These measurements can then provide or be used to calculate the force of distributing the trailer tongue load across the tow vehicle and the trailer, or over all axles, and enable a user to more safely load, set up, and drive a tow vehicle and trailer (trailer frame 106) combination.

Figure 21:
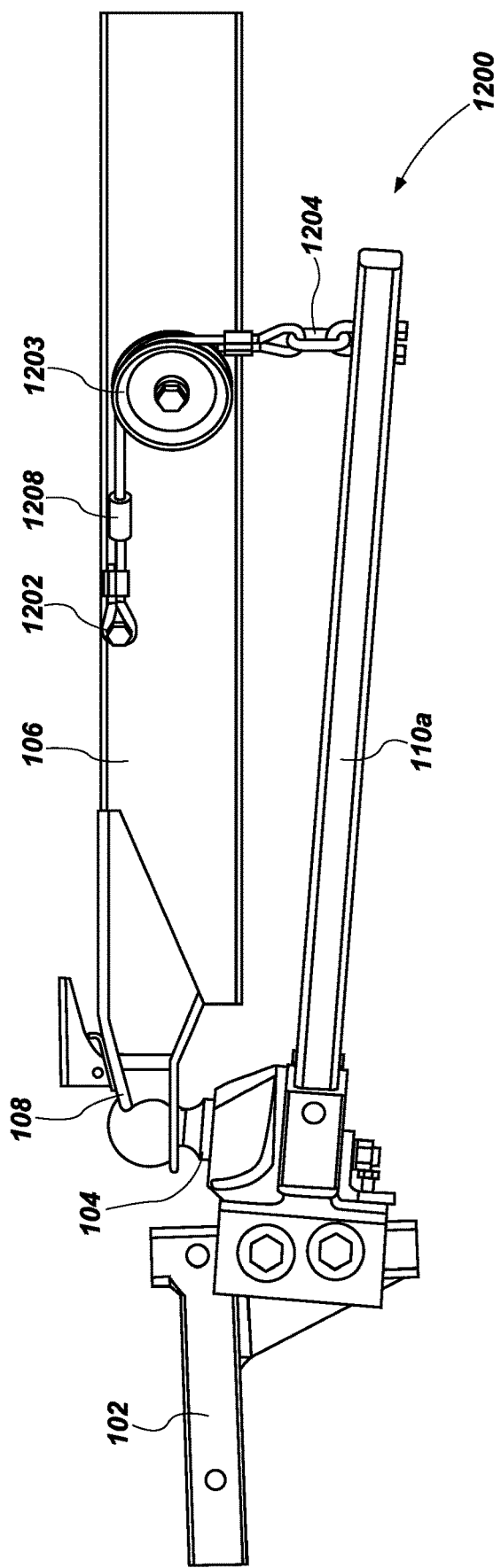
FIG. 21 is a perspective side view of another embodiment of an embodiment of a trailer force measurement system according to the present disclosure.
Figure 22:
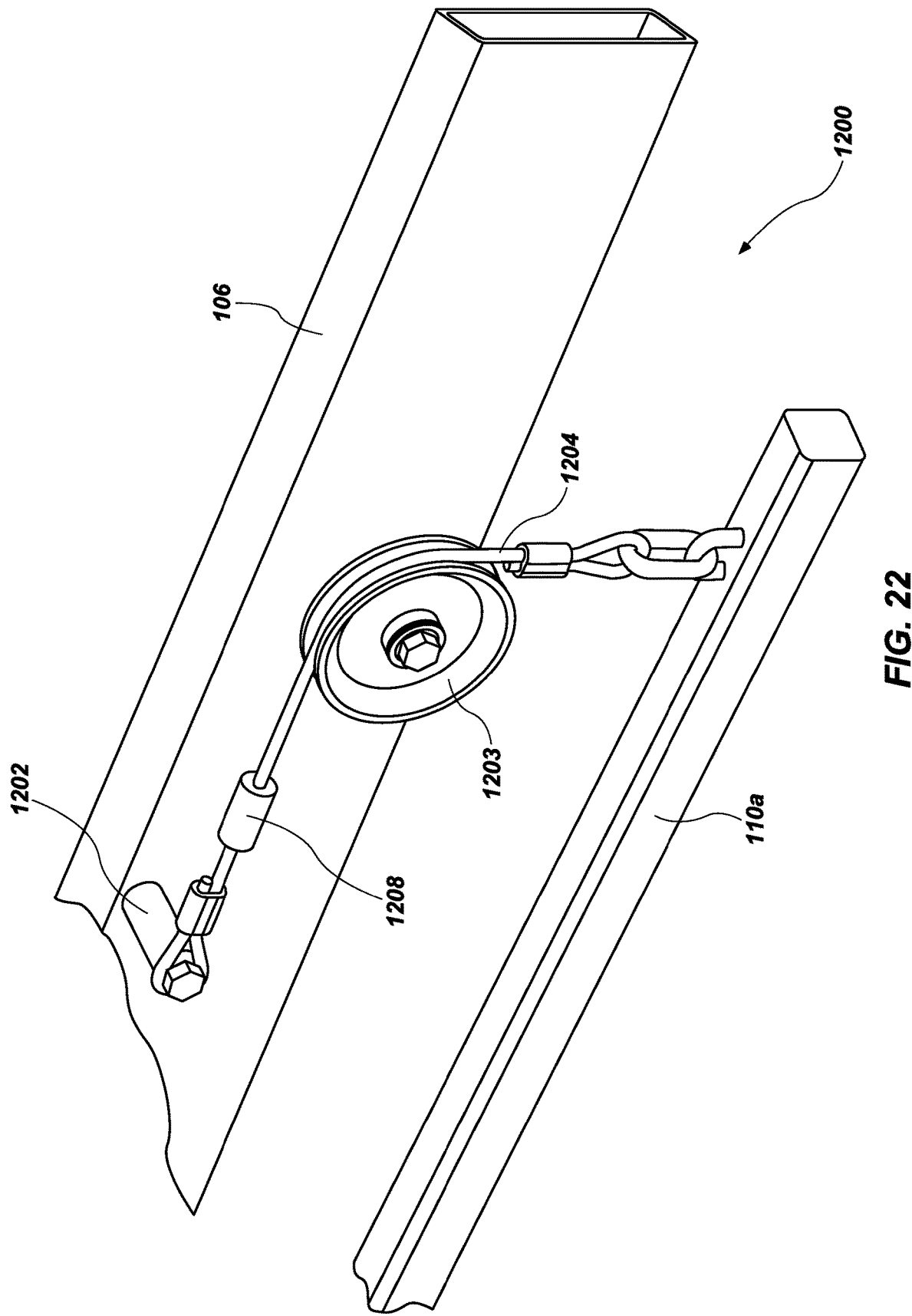
FIG. 22 is a zoomed-in perspective side view of the embodiment of FIG. 21.

FIGS. 21 and 22 illustrate an embodiment of a force measurement system 1200 which includes the weight distribution hitch 102, ball mount 104, trailer frame 106, hitch coupler 108 and spring bars 110a and 110b, as described in more detail above. The force measurement system 1200 also includes a mounting pin 1202 which can be fixed, or removably coupled, to (or otherwise disposed on) the trailer frame 106. The mounting pin 1102 be formed as a peg, hook or other desired shape, to removably secure a flexible line 1204 to the trailer frame 106. The flexible line 1204 is attached to both the spring bar 110a and the mounting pin 1202. The flexible line 1204 is passed over a pulley 1203, which is located between the mounting pin 1202 and the spring bar 110a and enables a mechanically advantageous mechanism for securing the spring bar 110a to the trailer frame 106 using the flexible line 1204. The flexible line 1204 can be a chain, cord, rope or other desired line. Force measurement system 1200 also includes a force measurement device, such as a load cell 1208, or transducer, which can be mounted or integrated, either permanently or removably, to (or otherwise disposed on) the flexible line 1204 (and similarly with a corresponding bracket and load cell relative to spring bar 110b, not shown). Therefore, when the spring bar 110a pulls on the flexible line 1204 and thus exerts a tension force, then load cell 1208, integrated with the flexible line 1204, can measure the corresponding force.

The load cell 1208 can be configured to measure the force being exerted by the spring bar 110a, which is based upon the load of the trailer frame 106 (and the contents therein). The greater the load or weight of the trailer or trailer frame 106, the greater the force exerted by the spring bar 110a on the flexible line 1204.

The load cell 1208 can also be configured to measure the tension force, strain, displacement or pressure, and then transmit the measurement(s) to a display (not shown) via wired connection (not shown). Alternatively, the load cell 1208 may transmit information wirelessly to a remote display. These measurements can then provide or be used to calculate the force of distributing the trailer tongue load across the tow vehicle and the trailer, or over all axles, and enable a user to more safely load, set up, and drive a tow vehicle and trailer (trailer frame 106) combination.

Figure 23:
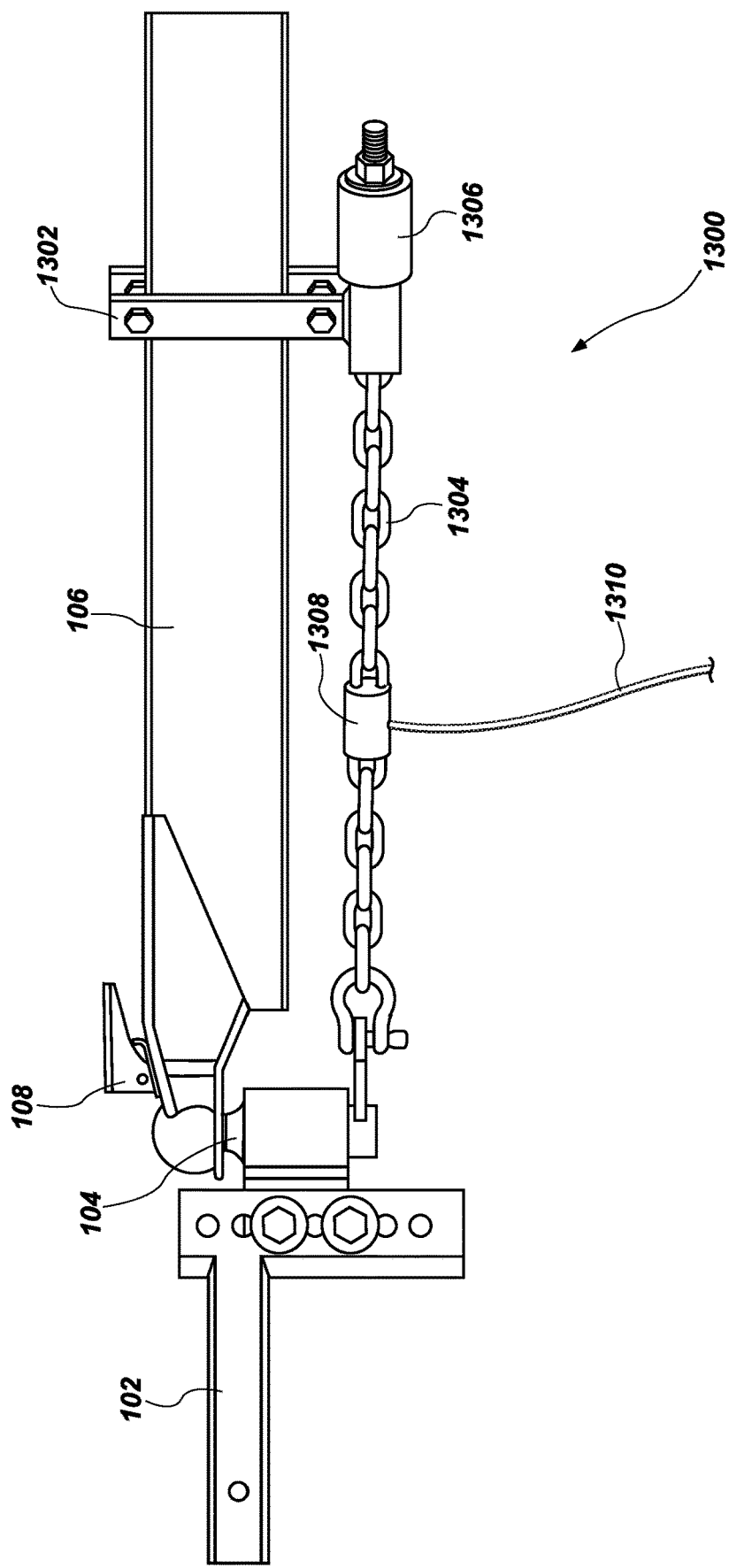
FIG. 23 is a perspective side view of another embodiment of an embodiment of a trailer force measurement system according to the present disclosure.

FIG. 23 illustrates an embodiment of a force measurement system 1300 which includes the weight distribution hitch 102, ball mount 104, trailer frame 106, and hitch coupler 108, as described in more detail above. The force measurement system 1300 also includes a bracket 1302 which can be fixed, or removably coupled, to (or otherwise disposed on) the trailer frame 106. The bracket 1302 can be bolted, or otherwise removably or fixedly secured to (or otherwise disposed on) trailer frame 106. The force measurement system 1300 also includes a flexible line 1304 attached to both the ball mount 104 and the bracket 1302. The flexible line 1304 is removably fixed to (or otherwise disposed on) the bracket 1302 via anchor 1306, which can also be secured to the bracket 1302 and can be used to increase the tension in the flexible line 1304. The flexible line 1304 can be a chain, cord, rope or other desired line.

Force measurement system 1300 also includes a force measurement device, such as a load cell 1308, or transducer, which can be mounted or integrated, either permanently or removably, to (or otherwise disposed on) the flexible line 1304 (and similarly with a corresponding bracket and load cell relative to an opposing side of the trailer frame, similar to the spring bar 110*b* configuration, not shown). Therefore, when the flexible line 1304 is pulled due to the weight of the trailer or trailer frame 106 a tension force is exerted on the flexible line 1304 and the load cell 1308, integrated with the flexible line 1304, can measure the corresponding force.

The load cell 1308 can be configured to measure the force being exerted on the flexible line 1304, which is based upon the load of the trailer frame 106 (and the contents therein). The greater the load or weight of the trailer or trailer frame 106, the greater the force exerted on the flexible line 1304.

The load cell 1308 can also be configured to measure the tension force, strain, displacement or pressure, and then transmit the measurement(s) to a display (not shown) via wired connection 1310. Alternatively, the load cell 1308 may transmit information wirelessly to a remote display. These measurements can then provide or be used to calculate the force of distributing the trailer tongue load across the tow vehicle and the trailer, or over all axles, and enable a user to more safely load, set up, and drive a tow vehicle and trailer (trailer frame 106) combination.

Figure 24:
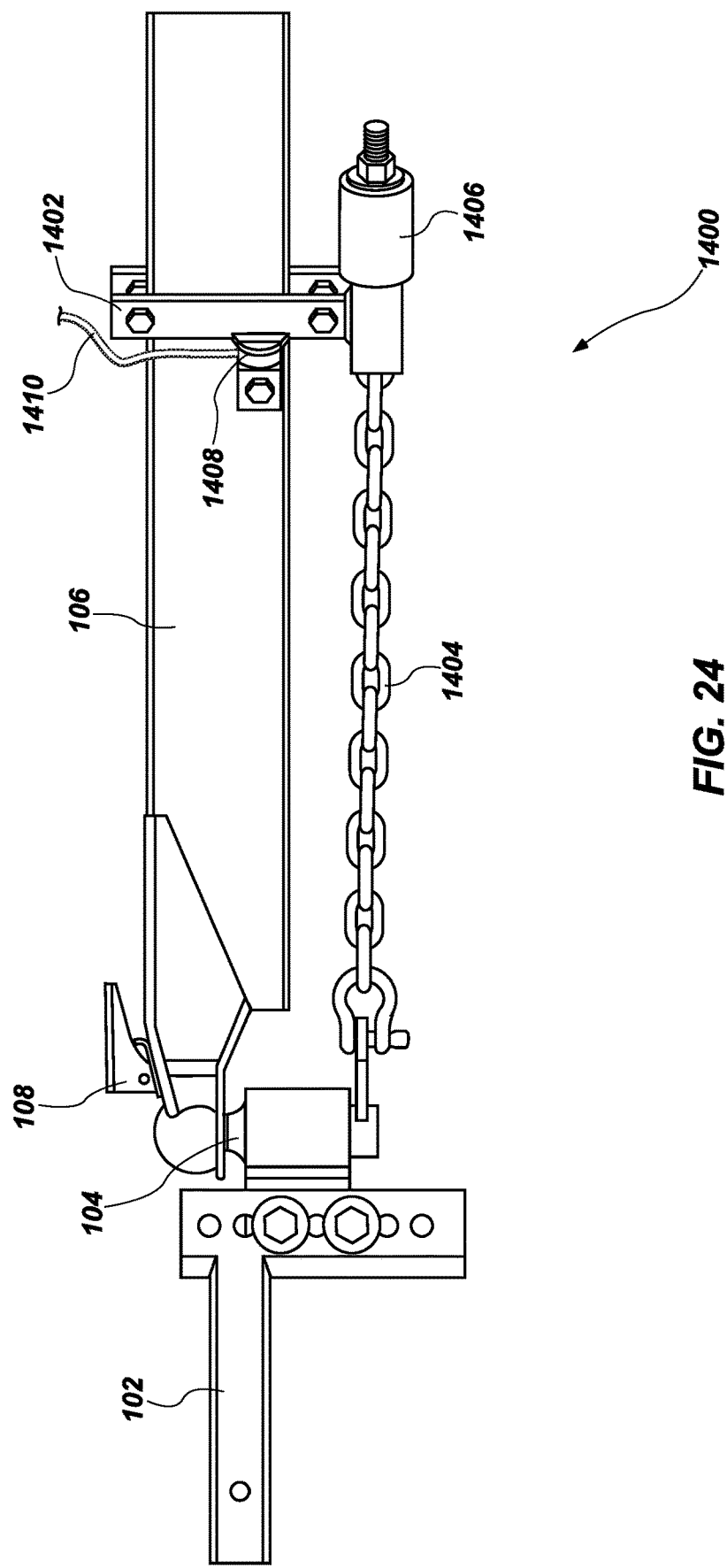
FIG. 24 is a perspective side view of another embodiment of an embodiment of a trailer force measurement system according to the present disclosure.

FIG. 24 illustrates an embodiment of a force measurement system 1400 which includes the weight distribution hitch 102, ball mount 104, trailer frame 106, and hitch coupler 108, as described in more detail above. The force measurement system 1400 also includes a bracket 1402 which can be fixed, or removably coupled, to (or otherwise disposed on) the trailer frame 106. The bracket 1402 can be bolted to, or otherwise removably or fixedly secured to (or otherwise disposed on) trailer frame 106. The force measurement system 1400 also includes a flexible line 1404 attached to both the ball mount 104 and the bracket 1402. The flexible line 1404 is removably fixed to (or otherwise disposed on) the bracket 1402 via anchor 1406, which can also be secured to the bracket 1402 and can be used to increase the tension in the flexible line 1404. The flexible line 1404 can be a chain, cord, rope or other desired line.

Force measurement system 1400 also includes a force measurement device, such as a load cell 1408, or transducer, which can be mounted or integrated, either permanently or removably, to (or otherwise disposed on) a surface of the bracket 1403 (and similarly with a corresponding bracket and load cell relative to an opposing side of the trailer frame, similar to the spring bar 110*b* configuration, not shown). The surface of the bracket 1402 that includes the load cell is substantially parallel with the flexible line 1404. Therefore, when the flexible line 1404 is pulled due to the weight of the trailer or trailer frame 106 a tension force is exerted on the flexible line 1404 and a strain force is exerted on the bracket 1402 which can be measured by the load cell 1408.

The load cell 1408 can be configured to measure the force being exerted on the bracket 1402, which is based upon the load of the trailer frame 106 (and the contents therein). The greater the load or weight of the trailer or trailer frame 106, the greater the force exerted on the flexible line 1404 and the bracket 1402.

The load cell 1408 can also be configured to measure the tension force, strain, displacement or pressure, and then transmit the measurement(s) to a display (not shown) via wired connection 1410. Alternatively, the load cell 1408 may transmit information wirelessly to a remote display. These measurements can then provide or be used to calculate the force of distributing the trailer tongue load across the tow vehicle and the trailer, or over all axles, and enable a user to more safely load, set up, and drive a tow vehicle and trailer (trailer frame 106) combination.

Figure 25:
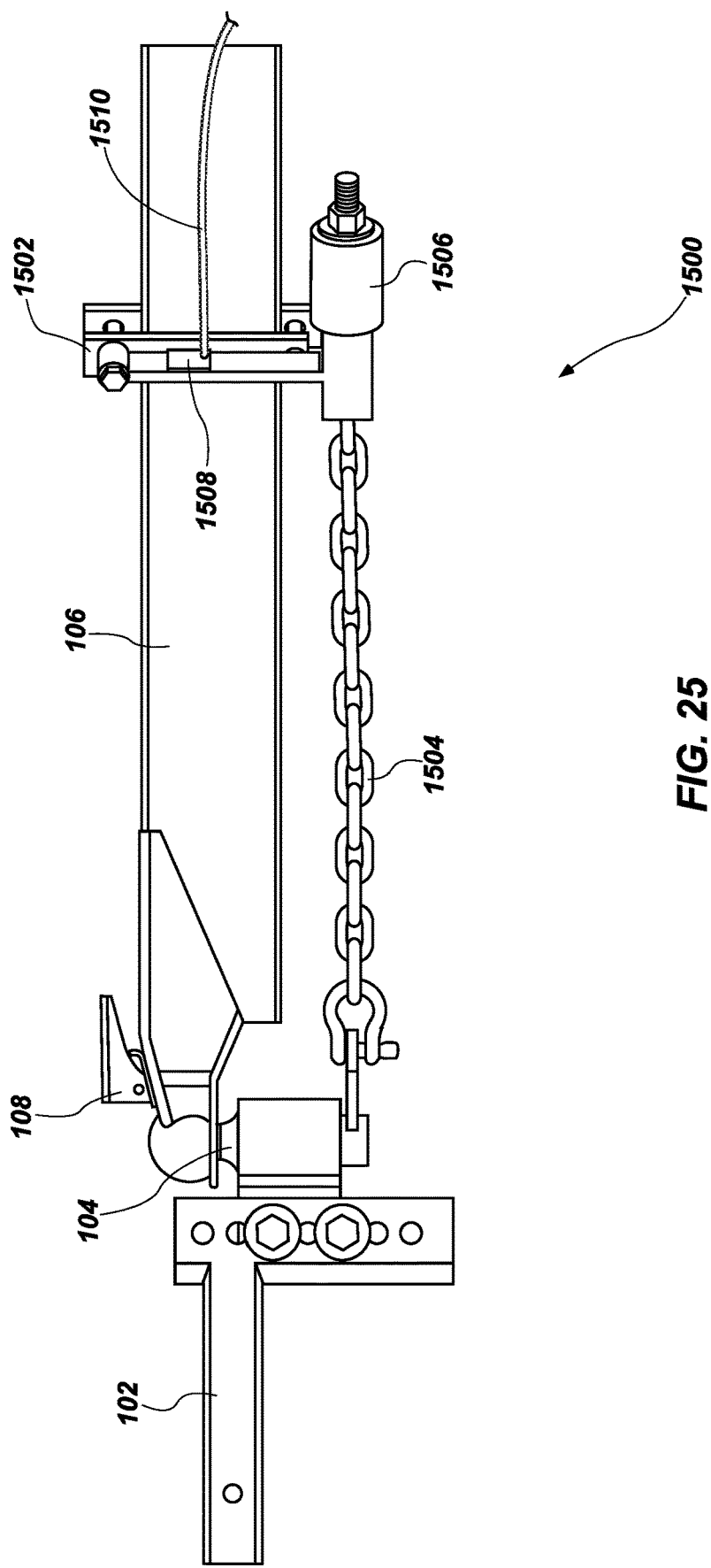
FIG. 25 is a perspective side view of another embodiment of an embodiment of a trailer force measurement system according to the present disclosure.

FIG. 25 illustrates an embodiment of a force measurement system 1500 which includes the weight distribution hitch 102, ball mount 104, trailer frame 106, and hitch coupler 108, as described in more detail above. The force measurement system 1500 also includes a bracket 1502 which can be fixed, or removably coupled, to (or otherwise disposed on) the trailer frame 106. The bracket 1502 can be bolted to, or otherwise removably or fixedly secured to (or otherwise disposed on) trailer frame 106. The force measurement system 1500 also includes a flexible line 1504 attached to both the ball mount 104 and the bracket 1502. The flexible line 1504 is removably fixed to (or otherwise disposed on) the bracket 1502 via anchor 1506, which can also be secured to the bracket 1502 and can be used to increase the tension in the flexible line 1504. The flexible line 1504 can be a chain, cord, rope or other desired line.

Force measurement system 1500 also includes a force measurement device, such as a strain gauge 1508, which can be mounted or integrated, either permanently or removably, to (or otherwise disposed on) a surface of the bracket 1502 (and similarly with a corresponding bracket and load cell relative to an opposing side of the trailer frame, similar to the spring bar 110*b* configuration, not shown). The surface of the bracket 1502 that includes the strain gauge 1508 can be substantially perpendicular with the flexible line 1504. Therefore, when the flexible line 1504 is pulled due to the weight of the trailer or trailer frame 106 a tension force is exerted on the flexible line 1504 and a strain force is exerted on the bracket 1502 which can be measured by the strain gauge 1508.

The strain gauge 1508 can be configured to measure the force being exerted on the bracket 1502, which is based upon the load of the trailer frame 106 (and the contents therein). The greater the load or weight of the trailer or trailer frame 106, the greater the force exerted on the flexible line 1504 and the bracket 1502.

The strain gauge 1508 can also be configured to measure strain and then transmit the measurement(s) to a display (not shown) via wired connection 1510. Alternatively, the strain gauge 1508 may transmit information wirelessly to a remote display. These measurements can then provide or be used to calculate the force of distributing the trailer tongue load across the tow vehicle and the trailer, or over all axles, and enable a user to more safely load, set up, and drive a tow vehicle and trailer (trailer frame 106) combination.

Figure 26:
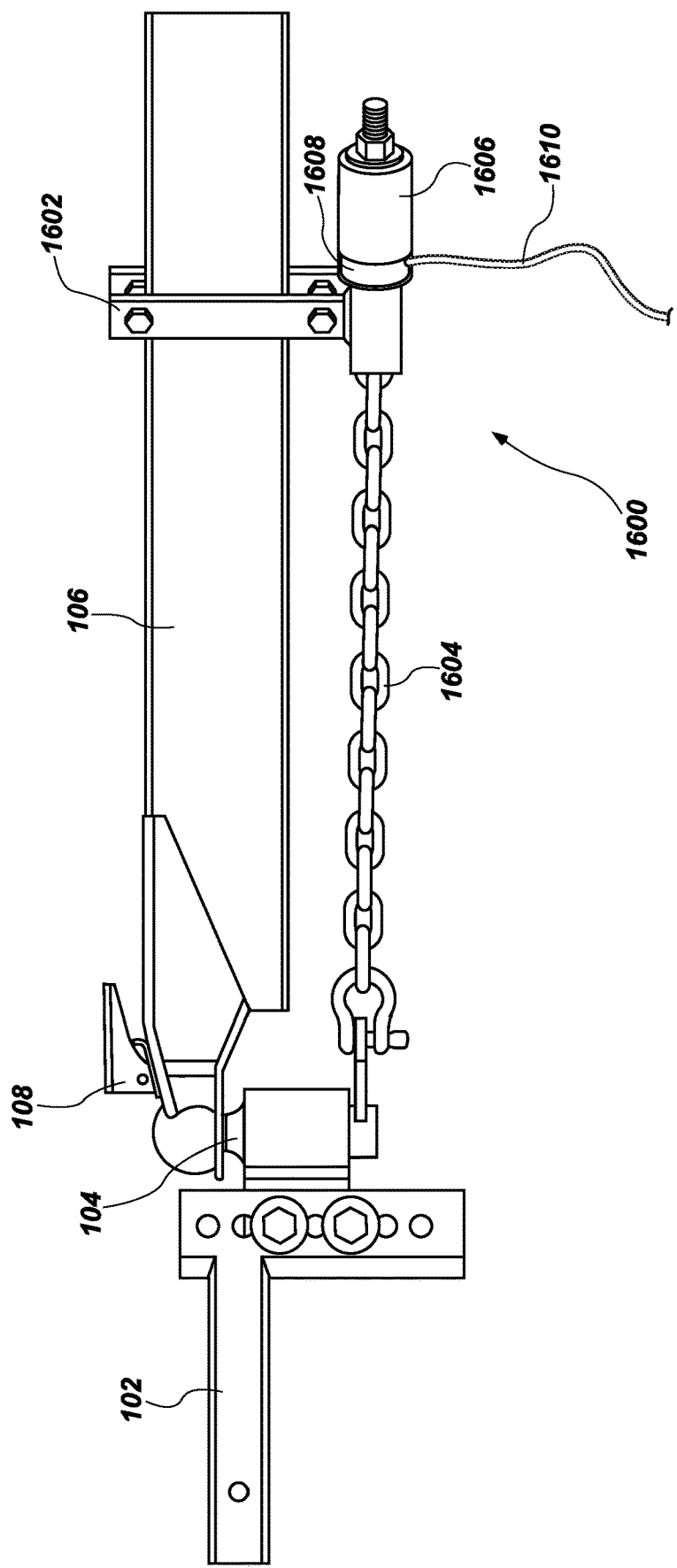
FIG. 26 is a perspective side view of another embodiment of an embodiment of a trailer force measurement system according to the present disclosure.

FIG. 26 illustrates an embodiment of a force measurement system 1600 which includes the weight distribution hitch 102, ball mount 104, trailer frame 106, and hitch coupler 108, as described in more detail above. The force measurement system 1300 also includes a bracket 1302 which can be fixed to, or removably coupled to (or otherwise disposed on) the trailer frame 106. The bracket 1302 can be bolted to, or otherwise removably or fixedly secured to (or otherwise disposed on) trailer frame 106. The force measurement system 1600 also includes a flexible line 1604 attached to both the ball mount 104 and the bracket 1602. The flexible line 1604 is removably fixed to (or otherwise disposed on) the bracket 1602 via anchor 1606, which can also be secured to the bracket 1602 and can be used to increase the tension in the flexible line 1604. The flexible line 1604 can be a chain, cord, rope or other desired line.

Force measurement system 1600 also includes a force measurement device, such as a load cell 1608, or transducer, which can be mounted, integrated or disposed, either permanently or removably, between the anchor 1606 and the bracket 1602 (and similarly with a corresponding bracket and load cell relative to an opposing side of the trailer frame, similar to the spring bar 110b configuration, not shown). Therefore, when the flexible line 1604 is pulled due to the weight of the trailer or trailer frame 106 a tension force is exerted on the flexible line 1604, pulling the anchor 1606 toward the bracket 1602 and exerting a compression force on the load cell 1608.

The load cell 1608 can be configured to measure the force being exerted on the flexible line 1604, which is based upon the load of the trailer frame 106 (and the contents therein). The greater the load or weight of the trailer or trailer frame 106, the greater the force exerted on the flexible line 1604.

The load cell 1608 can also be configured to measure the tension force, strain, displacement or pressure, and then transmit the measurement(s) to a display (not shown) via wired connection 1610. Alternatively, the load cell 1608 may transmit information wirelessly to a remote display. These measurements can then provide or be used to calculate the force of distributing the trailer tongue load across the tow vehicle and the trailer, or over all axles, and enable a user to more safely load, set up, and drive a tow vehicle and trailer (trailer frame 106) combination.

Figure 27:
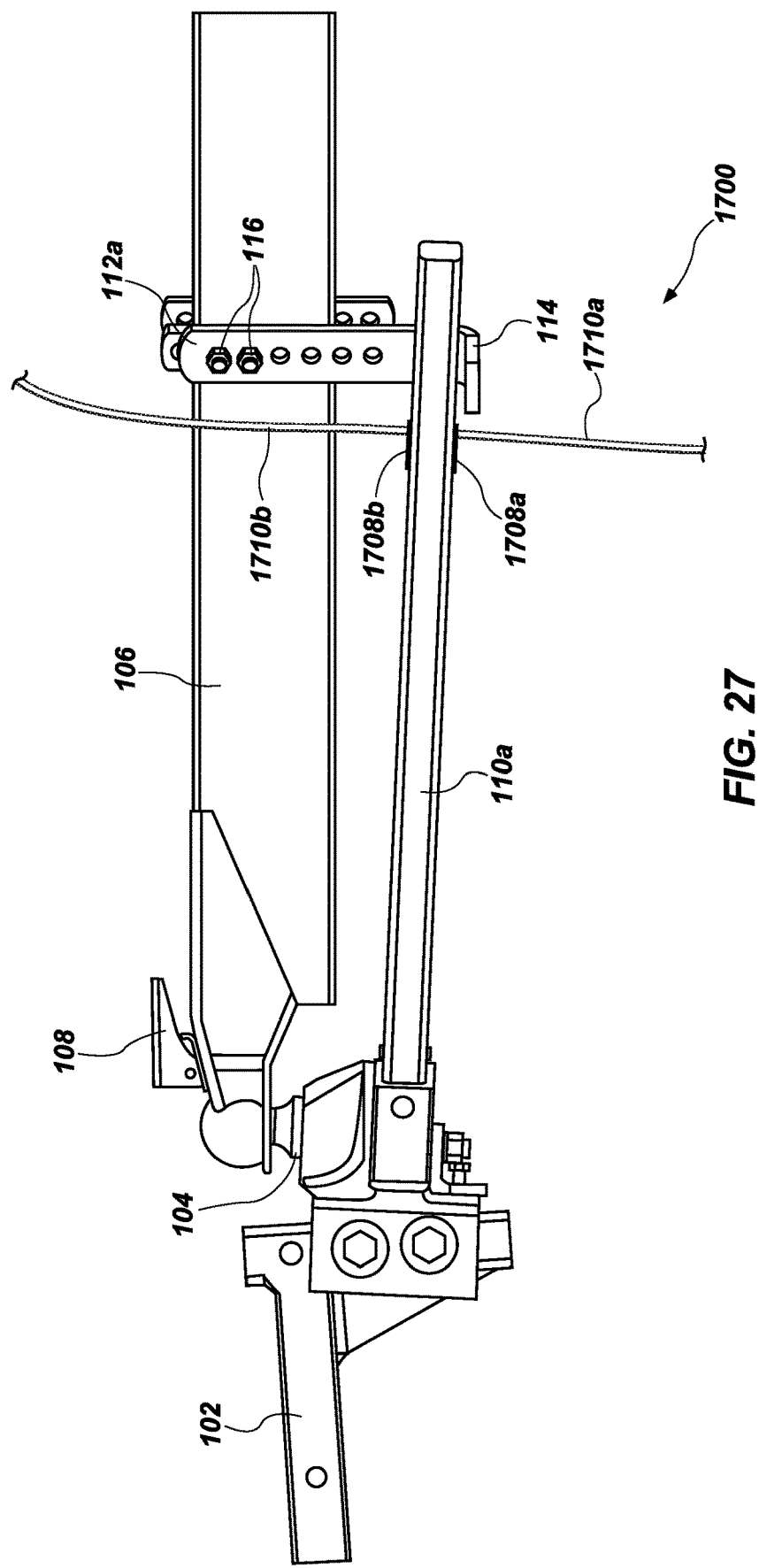
FIG. 27 is a perspective side view of another embodiment of an embodiment of a trailer force measurement system according to the present disclosure.

FIG. 27 illustrates an embodiment of a force measurement system 1700 which includes the weight distribution hitch 102, ball mount 104, trailer frame 106, hitch coupler 108 and the spring bars 110a and 110b, and the brackets 112a and 112b as described in more detail above. The force measurement system also includes a force measurement device, such as a pair of strain gauges 1708a and 1708b, which can be mounted, either permanently or removably, to (or otherwise disposed on) the spring bar 110a (and similarly with a corresponding pair of strain gauges on the spring bar 110b, not shown). The spring bar 110a rests on the flange 114 of the bracket 112a and thus exerts a compression force (or equalization force) on the bracket 112a, and internalizes a strain force within the spring bar 110a itself. The strain gauges 1708a and 1708b can be configured to measure the force being exerted on the spring bar 110a, which is based upon the load of the trailer frame 106 (and the contents therein). The greater the load or weight of the trailer or trailer frame 106, the greater the equalization force exerted on the spring bar 110a.

The strain gauges 1708a and 1708b can also be configured to measure the strain force on the spring bar 110a and then transmit the measurement(s) to a display (not shown) via wired connection 1710a and 1710b. Alternatively, the strain gauges 1708a and 1708b may transmit information wirelessly to a remote display. These measurements can then provide or be used to calculate the force of distributing the trailer tongue load across the tow vehicle and the trailer, or over all axles, and enable a user to more safely load, set up, and drive a tow vehicle and trailer (trailer frame 106) combination.

The term "force measurement device," as used herein, shall each be construed broadly to cover any device, now know or later discovered, capable of receiving force, or determining a quantity of force, or both, including but not limited to, a load cell, a coil spring, a tension spring, a hydraulic piston, a strain gauge, or any other suitable device capable of accomplishing the aforementioned function.

It is to be understood that the terms "load cell," "coil spring," "tension spring," "hydraulic piston," and "strain gauge," as used herein, are terms known to those having ordinary skill in the field of trailer hitch technology, and related fields. Each of these terms is a reference to a mechanism configured to receive or measure force, or both.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A trailer force measurement system, comprising:
a tow hitch;
a hitch mount connected to the tow hitch;
a spring bar having a first end portion connected to the hitch mount;
a trailer having a frame, wherein a second end portion of the spring bar is connected to the trailer frame via a bracket;
a hitch coupler connected to the trailer frame and configured to releasably couple the trailer frame to the hitch mount; and
a force measurement device disposed between the spring bar and the bracket and configured to measure force exerted on the bracket by the spring bar.

2. The system of claim 1, wherein the force measurement device measures compression force.

3. The system of claim 1, wherein the force measurement device measures tension force.

4. The system of claim 1, wherein the force measurement device is a load cell.

5. The system of claim 1, wherein the force measurement device is a coil spring.

6. The system of claim 1, wherein the force measurement device is a tension spring.

7. The system of claim 1, wherein the force measurement device is a hydraulic piston.

8. The system of claim 1, wherein the force measurement device is a strain gauge.

9. The system of claim 1, wherein the force exerted on the bracket by the spring bar increases as a weight of the trailer increases.

10. The system of claim 1, wherein the bracket is formed as an L-shape.

11. A trailer weight distribution system, comprising:
a tow hitch;
a hitch mount connected to the tow hitch;
a spring bar connected to the hitch mount;
a trailer having a frame, wherein the spring bar is connected to the trailer frame via a flexible line;
a hitch coupler connected to the trailer frame and configured to releasably couple the trailer frame to the hitch mount; and
a force measurement device disposed on the flexible line and configured to measure force exerted on the line by the spring bar.

12. The system of claim 11, wherein the force measurement device measures compression force.

13. The system of claim 11, wherein the force measurement device measures tension force.

14. The system of claim 11, wherein the force measurement device is a load cell.

15. The system of claim 11, wherein the force measurement device is a coil spring.

16. The system of claim 11, wherein the force measurement device is a tension spring.

17. The system of claim 11, wherein the force exerted on the bracket by the spring bar increases as a weight of the trailer increases.

18. A trailer force measurement system, comprising:
a tow hitch;
a hitch mount connected to the tow hitch;
a spring bar connected to the hitch mount;
a trailer having a frame, wherein the spring bar is connected to the trailer frame via a bracket and the bracket is slidably connected to the trailer frame;
a hitch coupler connected to the trailer frame and configured to releasably couple the trailer frame to the hitch mount; and
a force measurement device disposed between the trailer frame and the bracket and configured to measure force exerted on the frame by the bracket.

19. The system of claim 18, wherein the force measurement device measures compression force.

20. The system of claim 18, wherein the force measurement device measures tension force.

21. The system of claim 18, wherein the force measurement device is a load cell.

22. The system of claim 18, wherein the force measurement device is a coil spring.

23. The system of claim 18, wherein the force measurement device is a tension spring.

24. The system of claim 18, wherein the force measurement device is a hydraulic piston.

25. The system of claim 18, wherein the force measurement device is a strain gauge.

26. The system of claim 18, wherein the force exerted on the trailer frame by the bracket increases as a weight of the trailer increases.

27. A trailer force measurement system, comprising:
a tow hitch;
a hitch mount connected to the tow hitch;
a flexible line having a first end portion connected to the hitch mount;
a trailer having a frame, wherein a second end portion of the flexible line is connected to the trailer frame via a bracket;
a hitch coupler connected to the trailer frame and configured to releasably couple the trailer frame to the hitch mount; and
a force measurement device disposed on the flexible line between the first and second end portions and configured to measure force exerted on the flexible line by the hitch mount.

28. A trailer force measurement system, comprising:
a tow hitch;
a hitch mount connected to the tow hitch;
a spring bar having a first end portion connected to the hitch mount;
a trailer having a frame, wherein a second end portion of the spring bar is connected to the trailer frame via a bracket;
a hitch coupler connected to the trailer frame and configured to releasably couple the trailer frame to the hitch mount; and
a force measurement device disposed on the spring bar between the spring bar and the bracket and configured to measure force exerted on the spring bar by the trailer.

29. A trailer force measurement system, comprising:
a tow hitch;
a hitch mount connected to the tow hitch;
a flexible line having a first end portion connected to the hitch mount;
a trailer having a frame, wherein a second end portion of the flexible line is connected to the trailer frame via a bracket;
a hitch coupler connected to the trailer frame and configured to releasably couple the trailer frame to the hitch mount; and
a force measurement device disposed between the bracket and the flexible line and configured to measure force exerted on the bracket by the flexible line.

* * * * *